US012698942B2

(12) United States Patent
Strommegjerde et al.

(10) Patent No.: US 12,698,942 B2
(45) Date of Patent: Aug. 4, 2026

(54) METHOD, SYSTEM AND APPARATUS FOR HYDROCARBON FLOW SYSTEM FLUID COOLING

(71) Applicant: Empig AS, Trondheim (NO)

(72) Inventors: Lars S Strommegjerde, Ranheim (NO); Fredrik Lund, Trondheim (NO); Thomas Sperle, Ranheim (NO)

(73) Assignee: EMPIG AS, Trondheim (NO)

( * ) Notice: Subject to any disclaimer, the term of this patent is extended or adjusted under 35 U.S.C. 154(b) by 688 days.

(21) Appl. No.: 18/008,297

(22) PCT Filed: May 31, 2021

(86) PCT No.: PCT/EP2021/064572
§ 371 (c)(1),
(2) Date: Dec. 5, 2022

(87) PCT Pub. No.: WO2021/245034
PCT Pub. Date: Dec. 9, 2021

(65) Prior Publication Data

US 2023/0204309 A1 Jun. 29, 2023

(30) Foreign Application Priority Data

Jun. 5, 2020 (GB) ..................................... 2008533

(51) Int. Cl.
*F28G 15/00* (2006.01)
*B08B 7/00* (2006.01)
(Continued)

(52) U.S. Cl.
CPC .......... *F28G 15/003* (2013.01); *B08B 7/0071* (2013.01); *B08B 9/027* (2013.01);
(Continued)

(58) Field of Classification Search
CPC ...... F28G 13/005; F28G 15/003; E21B 37/00; E21B 36/00; E21B 36/04
See application file for complete search history.

(56) References Cited

U.S. PATENT DOCUMENTS 4,577,677 A 3/1986 Ezzell
8,623,147 B2 1/2014 Hoffman et al.
(Continued)

FOREIGN PATENT DOCUMENTS

CN 110863798 A * 3/2020 ............. E21B 37/00
GB 2468920 A 9/2010
(Continued)

*Primary Examiner* — Eric S Ruppert
(74) *Attorney, Agent, or Firm* — FisherBroyles, LLP

(57) ABSTRACT

The invention provides a method of cooling a flowing fluid in a hydrocarbon flow system using a heat exchange cooler apparatus having at least one cooler conduit; and a sensor system. The method comprises flowing the fluid through the cooler conduit from a cooler inlet to a cooler outlet to cool the fluid and operating a cleaning system to deliver energy (e.g. heat) to the cooler conduit to cause solid materials deposited on the interior of the cooler to be released into the flowing fluid. A cooler sensor data set obtained from the sensor system is compared with a reference data set to verify the performance of the cleaning system.

23 Claims, 14 Drawing Sheets

(51) Int. Cl.

| | |
|---|---|
| ***B08B 9/027*** | (2006.01) |
| ***F28G 9/00*** | (2006.01) |
| ***F28G 13/00*** | (2006.01) |
| *F28D 21/00* | (2006.01) |

(52) U.S. Cl.

CPC ............. *F28G 9/00* (2013.01); *F28G 13/005* (2013.01); *F28D 2021/0059* (2013.01); *F28F 2200/00* (2013.01)

(56) References Cited

U.S. PATENT DOCUMENTS

| | | | | |
|---|---|---|---|---|
| 2009/0321366 | A1 | 12/2009 | Poorte | |
| 2010/0300486 | A1* | 12/2010 | Hoffman | F28G 15/003 702/170 |
| 2011/0308548 | A1* | 12/2011 | Amundsen | G01B 21/085 374/7 |
| 2012/0199310 | A1 | 8/2012 | Koenig et al. | |
| 2013/0340793 | A1 | 12/2013 | Lund | |
| 2016/0279684 | A1 | 9/2016 | Lund | |
| 2018/0094885 | A1 | 4/2018 | Narukawa et al. | |
| 2019/0084016 | A1 | 3/2019 | Strommegjerde et al. | |

FOREIGN PATENT DOCUMENTS

| | | | | |
|---|---|---|---|---|
| GB | 2548096 | A | 9/2017 | |
| NO | 333249 | B1 | 8/2010 | |
| WO | WO2004/059178 | A2 | 7/2004 | |
| WO | WO2009/051495 | A | 4/2009 | |
| WO | WO2010/009110 | A | 1/2010 | |
| WO | WO2010/110674 | A | 9/2010 | |
| WO | WO2010/110676 | A2 | 9/2010 | |
| WO | WO2013/125960 | A | 8/2013 | |
| WO | WO-2014040648 | A1 * | 3/2014 | F28G 13/005 |
| WO | WO2015/062878 | A1 | 5/2015 | |
| WO | WO2016/123340 | A | 8/2016 | |

* cited by examiner

METHOD, SYSTEM AND APPARATUS FOR HYDROCARBON FLOW SYSTEM FLUID COOLING

This application is the U.S. National Stage of International Application No. PCT/EP2021/064572, which was filed on May 31, 2021. This application also claims the benefit of the filing date of GB patent application No. GB2008533.8, which was filed on Jun. 5, 2020. The contents of both of those applications are hereby incorporated by reference.

The present invention relates to an apparatus and method for cooling fluids in hydrocarbon flow systems, and in particular to an apparatus and method of use which cool fluid in a hydrocarbon fluid cooler system to a temperature greater than an ambient temperature of a cooling medium. Aspects of the invention include a method of monitoring a cooler apparatus for a hydrocarbon flow system using temperature and/or pressure sensors, methods of determining a design parameter of a cooler system, and methods of manufacture. Aspects of the invention have particular application to subsea hydrocarbon flow systems in which seawater is the surrounding cooling medium in the heat exchange system. However, aspects of the invention also have application to cooler systems in other environments, including topsides or onshore active or passive cooler systems, in which the cooling medium in the heat exchange system may be water, air, or another cooling fluid such as glycol. The invention has application to Cold Flow systems, and to general coolers, for example to lower the temperature of fluids before flowing into downstream processing and/or transportation equipment.

BACKGROUND TO THE INVENTION

In the field of oil and gas production and transportation, flow assurance is a term used to relate to the various methods, technologies and strategies that ensure that the flow of hydrocarbons from the reservoir to the point of sale is uninterrupted. In shallow water or on onshore production environments, various flow assurance methods are known, including mechanical, thermal and chemical processes. Particular difficulties exist in subsea production environments, where deepwater and/or long flowlines between wellheads and subsea manifolds or production installations make flow assurance challenging, costly, and with high environmental impact. Current flow assurance technology represents the biggest cost driver in the oil and gas industry, and represents a limitation to pipeline reach and in the economics of field development.

A typical flow assurance problem addressed by the invention is the build-up of compounds including waxes and hydrates (and to a lesser extent, asphaltenes, higher paraffins, and combinations of these compounds), and/or scaling due to build-up of salts, minerals and sulphates. Hydrates that are naturally formed will be in the form of gas and water, forming a slurry phase (unstable) first then form a solid material or plug. Build-ups or deposits of such materials must be dealt with to reduce their impact on production rates and avoid clogging of the flowlines, pipes and production equipment.

Waxes start to form in a hydrocarbon fluid when the fluid cools to the Wax Appearance Temperature (WAT) of that fluid, or on a relatively cold pipe wall even when the bulk flow of fluid is above the WAT. Hydrates begin to form at the (pressure dependent) Hydrate Equilibrium Temperature (HET). Known methods of flow assurance include efforts to keep the flowing hydrocarbon warm and/or the formation of solids inhibited with chemicals such as mono-ethylene glycol (MEG). These methods require additional infrastructure such as flowline insulation, pipeline trenching, electrical heating, power supply, chemical injection and recovery points, injection lines/umbilicals, and/or cleaning regimes such as pipeline pigging and/or hot oil flushing from topsides. These known methods have various drawbacks, deficiencies, and limitations to their application, such as high cost, shut in requirements during cleaning, reduced production and pipeline redundancy, particularly in extreme pressures and temperatures or over long flow distances, and can be high in cost.

Cold Flow methods are distinct from the methods by which the flowing hydrocarbon is kept warm and/or chemically inhibited; Cold Flow is generally known as the concept of cooling a hydrocarbon product down to ambient or near-ambient temperature, allowing one to transport the product in a cold, inert and stable state, without the need of chemical injection, thermal insulation on the pipes, or pipe heating and so on.

WO2004/059178 describes a method and system for transporting hydrocarbons in which the flow of hydrocarbons is mixed with another flowing fluid having a temperature below a crystallisation temperature for a precipitating solids.

US 2010/0300486 describes a cold flow system which includes the removal of precipitated wax from the inner surface of a pipeline wall by heating the inner wall for a short period of time to release the deposited wax.

WO2015/062878 describes a cold flow system which enables removal of wax and hydrate deposits by driving a vehicle bi-directionally on the cooling flowline.

Cold flow systems such as those described in the above-referenced documents all operate by cooling the hydrocarbon flow down to or very close to the ambient temperature of the environment surrounding the pipeline to enable cold multiphase transport of the hydrocarbon product. In many applications, this will require large-scale cooler apparatus to fully cool the flowing hydrocarbons, limiting their economic and/or technical feasibility due to the high capital expenditure and operational burden of maintaining and cleaning the cooler.

In addition to Cold Flow applications, coolers are used more generally in hydrocarbon systems to reduce the temperature of flowing fluids to a target temperature. In such applications, the cooler system may be referred to a step cooler, and may be used generally in high temperature oilfields, or may be located in a flow system upstream of equipment to reduce the temperature of fluid flowing into that equipment, to protect it from fluid temperatures that exceeds its optimum operating range. Typical examples include subsea or topsides equipment for separation, boosting, and compression. Where the outlet temperature of the cooler is at or around the WAT or HET, or when the surfaces of the flow system are sufficient cold, solid deposits will tend to form in the cooler. These are conventionally treated by chemical inhibitors (e.g. wax inhibitors or mono-ethylene glycol), with the required chemical injection and topside handling, separation and regeneration infrastructure. Step coolers may be used in conjunction with Cold Flow cooler systems, typically upstream of the Cold Flow cooler. For example, a step cooler may be upstream of a water knockout system, which itself is upstream of a Cold Flow cooler system. Alternatively, or in addition, a step cooler may be used downstream of a Cold Flow system, for example at the outlet of a gas compression system to mitigate against a temperature rise associated with the operation of the compressor.

SUMMARY OF INVENTION

There is generally a need for an apparatus and method which addresses one or more of the flow assurance problems identified above.

It is amongst the aims and objects of the invention to provide a method for precipitation of solids in hydrocarbon flow systems and which obviates or mitigates one or more drawbacks or disadvantages of the prior art.

According to a first aspect of the invention, there is provided a method of cooling a flowing fluid in a hydrocarbon flow system using a heat exchange cooler apparatus, wherein the heat exchange cooler apparatus comprises:

at least one cooler conduit; and a sensor system;

the method comprising:

flowing the fluid through the cooler conduit from a cooler inlet to a cooler outlet to cool the fluid;

operating a cleaning system, the cleaning system delivering energy to the cooler conduit to cause solid materials deposited on the interior of the cooler to be released into the flowing fluid;

receiving a cooler sensor data set obtained from the sensor system; and comparing the cooler sensor data set with a reference data set to verify the performance of the cleaning system.

The sensor system may comprise at least one temperature sensor. The sensor system may comprise an outlet temperature sensor at or near a cooler outlet. The sensor system may comprise an inlet temperature sensor at or near a cooler inlet. Alternatively, or in addition, the sensor system may comprise one or more temperature sensors distributed along the length of the cooler conduit. The reference data set may comprise reference temperature data.

The sensor system may comprise at least one pressure sensor. The sensor system may comprise at least two pressure sensors separated along the length of the cooler conduit, which may be configured for measuring a pressure differential along at least a part of the cooler conduit. Alternatively, or in addition, the sensor system may comprise one or more pressure sensors distributed along the length of the cooler conduit, which may be configured for measuring a pressure differential along different parts of the cooler conduit. The reference data set may comprise reference pressure data.

The sensor system may comprise both temperature sensors and pressure sensors, in any of the combinations referred to above. The reference data set may comprise reference temperature data and reference pressure data.

The method may comprise operating the cleaning system cyclically, or during multiple discrete time intervals, which may be repeated during the cooling of the flowing fluid.

Preferably the method comprises delivering energy to the cooler conduit to cause solid materials deposited on the interior of the cooler to be released into the flowing fluid as particles (for example, flakes of material).

The cleaning system may be configured to heat the cooler conduit. The cleaning system may be located externally of the conduits of the cooler system.

The cleaning system may comprise inductive heating elements, electrical trace heating elements, and/or hot fluid trace heating conduits, any of which may be located externally of the conduits to be cleaned.

Alternatively, or in addition, the cleaning system may comprise a hot fluid flushing system, configured to direct a relatively hot fluid (for example hot oil) through the cooler conduit to remove deposits of precipitated solids from the inner walls of the conduit.

The reference data set may comprise a theoretical or calculated data set, and/or may comprise a measured data set. The reference data set may correspond to a measured or calculated condition corresponding to a clean state of the cooler conduit. The reference data set may comprise measured data from the sensor system from a first time earlier than an acquisition time of the sensor data set, and may comprise measured data from a series of times earlier than an acquisition time of the sensor data set.

The reference data set may comprise a differential pressure data set measured or calculated when the cooler conduit is known or assumed to be in a clean state.

The reference data set may comprise a temperature data set measured or calculated when the cooler conduit is known or assumed to be in a clean state.

The reference data set may comprise a plurality of data points corresponding to a plurality of positions separated along the length of the cooler conduit. The reference data set may comprise one or more measured data points, and one or more data points extrapolated and/or interpolated from the measured data points.

The cooler sensor data set may comprise a cooler exit temperature, and may further comprise a cooler inlet temperature. The cooler sensor data set may comprise a plurality of data points corresponding to sensors at plurality of positions separated along the length of the cooler conduit.

The sensor system may comprise sensors external to the cooler conduit, or sensors internal to the cooler conduit, or a combination of external and internal sensors.

Verifying the performance of the cleaning system may comprise identifying the presence or absence of a condition indicative of a build-up and/or removal of deposits on surfaces of the cooler conduit. The condition may be a change in the sensor data set with respect to the reference data set. The condition may be a trend in temperature and/or differential pressure. The trend may be an upward trend indicative of a build-up of deposits on surfaces of the cooler conduit, or may be a downward trend indicative of removal of deposits on surfaces of the cooler conduit. Verifying the performance of the cleaning system may be over a period of time greater than a single cleaning cycle.

The method may comprise adjusting an operating parameter of the cleaning system in response to the comparison of the cooler sensor data set with the reference data set. The operating parameter may be selected from the group comprising: frequency of cleaning cycle; intensity of cleaning operation; duration of cleaning operation; location of cleaning operation; physical extent of cleaning operation; type of cleaning operation.

According to a second aspect of the invention there is provided a cooler system for a hydrocarbon flow system comprising:

a heat exchange cooler apparatus comprising at least one cooler conduit and a sensor system;

a cleaning system operable to delivering energy to the cooler conduit to cause solid materials deposited on the interior of the cooler to be released into the flowing fluid; and a processing module;

wherein the processing module is configured to receive a cooler sensor data set obtained from the sensor system and compare the cooler sensor data set with a reference data set to verify the performance of the cleaning system.

The sensor system may comprise at least one temperature sensor. The sensor system may comprise an outlet temperature sensor at or near a cooler outlet. The sensor system may comprise an inlet temperature sensor at or near a cooler inlet. Alternatively, or in addition, the sensor system may comprise one or more temperature sensors distributed along the length of the cooler conduit. The reference data set may comprise reference temperature data.

The sensor system may comprise at least one pressure sensor. The sensor system may comprise at least two pressure sensors separated along the length of the cooler conduit, which may be configured for measuring a pressure differential along at least a part of the cooler conduit. Alternatively, or in addition, the sensor system may comprise one or more pressure sensors distributed along the length of the cooler conduit, which may be configured for measuring a pressure differential along different parts of the cooler conduit. The reference data set may comprise reference pressure data.

Embodiments of the second aspect of the invention may comprise features of the first aspect of the invention or its embodiments, and vice versa.

According to a third aspect of the invention, there is provided a method of cleaning a cooler conduit of a heat exchange cooler in a hydrocarbon flow system, the method comprising:

- operating a cleaning system to deliver energy to the cooler conduit and cause solid materials deposited on the interior of the cooler to be released into the flowing fluid;
- receiving a cooler sensor data set obtained from a sensor system of the cooler; and
- comparing the cooler sensor data set with a reference data set to verify the performance of the cleaning system.

Within the scope of the invention, receiving a cooler sensor data set and comparing with a reference data set may be performed locally to the cleaning system and cooler conduit, or may be performed in a remote location from the cleaning system and cooler conduit, including in another international jurisdiction. Alternatively or in addition, comparing with a reference data set may be performed in real-time with the acquisition of the cooler sensor data set, a short time after the acquisition of the cooler sensor data set, or at a significantly later time.

Embodiments of the third aspect of the invention may comprise features of the first or second aspects of the invention or their embodiments, and vice versa.

According to a fourth aspect of the invention, there is provided a method of assessing the performance of a cooler system in a hydrocarbon flow system, the cooler system comprising:

- a heat exchange cooler apparatus comprising at least one cooler conduit and a sensor system; and
- a cleaning system operable to delivering energy to the cooler conduit to cause solid materials deposited on the interior of the cooler to be released into the flowing fluid;

the method comprising:

- receiving a cooler sensor data set obtained from the sensor system; and
- comparing the cooler sensor data set with a reference data set to evaluate the performance of the cleaning system and/or cooler system.

Within the scope of the invention, receiving a cooler sensor data set and comparing with a reference data set may be performed locally to the cleaning system and cooler conduit, or may be performed in a remote location from the cleaning system and cooler conduit, including in another international jurisdiction. Alternatively or in addition, comparing with a reference data set may be performed in real-time with the acquisition of the cooler sensor data set, a short time after the acquisition of the cooler sensor data set, or at a significantly later time.

Embodiments of the fourth aspect of the invention may comprise features of the first to third aspects of the invention or their embodiments, and vice versa.

According to a fifth aspect of the invention, there is a provided a method of testing a hydrocarbon fluid using a heat exchange cooler apparatus, wherein the heat exchange cooler apparatus comprises:

- at least one cooler conduit; and
- a plurality of temperature sensors separated along the length of the cooler conduit;

wherein the method comprises:

- flowing the fluid through the cooler conduit from a cooler inlet to a cooler outlet to cool the fluid;
- receiving a cooler temperature data set obtained from the plurality of temperature sensors; and
- comparing the cooler temperature data set with a reference temperature data set to determine one or more characteristics relating to the precipitation of solids in the cooler.

The plurality of temperature sensors may comprise an outlet temperature sensor at or near a cooler outlet. The plurality of temperature sensors may comprise an inlet temperature sensor at or near a cooler inlet. Alternatively, or in addition, the plurality of temperature sensors may comprise one or more temperature sensors distributed along the length of the cooler conduit.

The reference temperature data set may comprise a theoretical or calculated temperature data set, and/or may comprise a measured temperature data set. The reference data set may correspond to a measured or calculated condition corresponding to a clean state of the cooler conduit. The reference temperature data set may comprise measured temperature data from the plurality of temperature sensors from a first time earlier than an acquisition time of the cooler temperature data set, and may comprise measured data from a series of times earlier than an acquisition time of the cooler temperature data set.

The plurality of temperature sensors may comprise sensors external to the cooler conduit, or sensors internal to the cooler conduit, or a combination of external and internal sensors.

The plurality of temperature sensors may comprise a plurality of discrete sensors, or may comprise a plurality of virtual sensors defined on a distributed temperature sensor system.

The determined characteristics may comprise one or more characteristics selected from the group comprising: the presence or absence of precipitation; an onset temperature for precipitation of a solid; Wax Appearance Temperature (WAT); Hydrate Equilibrium Temperature (HET); rate of deposition of a solid.

The method may comprise operating a cleaning system, and comparing the cooler sensor data set with a reference data set to verify the performance of the cleaning system.

Embodiments of the fifth aspect of the invention may comprise features of the first to fourth aspects of the invention or their embodiments, and vice versa.

According to a sixth aspect of the invention, there is provided a method of cooling a flowing fluid in a hydrocarbon flow system using a heat exchange cooler apparatus, wherein the heat exchange cooler apparatus comprises:

at least one cooler conduit; and a plurality of temperature sensors separated along the length of the cooler conduit;

wherein the method comprises:

flowing the fluid through the cooler conduit from a cooler inlet to a cooler outlet to cool the fluid;

receiving a cooler temperature data set obtained from the plurality of temperature sensors; and comparing the cooler temperature data set with a reference temperature data set to determine one or more characteristics relating to the precipitation of solids in the cooler.

Embodiments of the sixth aspect of the invention may comprise features of the first to fifth aspects of the invention or their embodiments, and vice versa.

According to a seventh aspect of the invention, there is provided a cooler system for a hydrocarbon flow system comprising:

a heat exchange cooler apparatus comprising at least one cooler conduit and a plurality of temperature sensors separated along the length of the cooler conduit; and a processing module;

wherein the processing module is configured to receive a cooler temperature data set obtained from the plurality of temperature sensors and compare the cooler temperature data set with a reference temperature data set to determine one or more characteristics relating to the precipitation of solids in the cooler.

Embodiments of the seventh aspect of the invention may comprise features of the first to sixth aspects of the invention or their embodiments, and vice versa.

According to an eighth aspect of the invention, there is provided a method of monitoring a heat exchange cooler in a hydrocarbon flow system, the heat exchange cooler having a cooler conduit and a plurality of temperature sensors separated along a length of the cooler conduit, wherein the method comprises:

receiving a cooler temperature data set obtained from the plurality of temperature sensors; and comparing the cooler temperature data set with a reference temperature data set to determine one or more characteristics relating to the precipitation of solids in the cooler.

Embodiments of the eighth aspect of the invention may comprise features of the first to seventh aspects of the invention or their embodiments, and vice versa.

According to a ninth aspect of the invention, there is provided a method of assessing the performance of a cooler system in a hydrocarbon flow system, the cooler system comprising a heat exchange cooler apparatus comprising at least one cooler conduit and a plurality of temperature sensors separated along the length of the cooler conduit; wherein the method comprises:

receiving a cooler temperature sensor data set obtained from the plurality of temperature sensors; and comparing the cooler temperature data set with a reference temperature data set to determine one or more characteristics relating to the precipitation of solids in the cooler.

Embodiments of the ninth aspect of the invention may comprise features of the first to eighth aspects of the invention or their embodiments, and vice versa.

According to a tenth aspect of the invention, there is provided a method of cooling a flowing fluid in a subsea hydrocarbon flow system using a heat exchange cooler apparatus located subsea upstream of a subsea fluid conduit, the method comprising:

flowing the fluid through the heat exchange cooler from a cooler inlet to a cooler outlet to cool the fluid from a first temperature to a second temperature at the cooler outlet; and flowing the fluid from the cooler outlet to the subsea fluid conduit;

wherein the cooling of the fluid in the heat exchange cooler apparatus precipitates at least one solid from the flowing fluid between the cooler inlet and the cooler outlet;

wherein second temperature is sufficiently low that the fluid is stable on entering the subsea fluid conduit with negligible rest potential for precipitation of the at least one solid on a surface of the subsea fluid conduit;

and wherein the second temperature is greater than a lowest ambient temperature of a cooling medium through which the subsea fluid conduit passes by an amount determined from an evaluation of data relating to precipitation of the at least one solid with respect to temperature.

The data relating to the precipitation of the at least one solid may comprise one or more of the following:

data relating to wax precipitation versus temperature;

hydrate precipitation data based on a pressure volume and temperature (PVT) model;

operational risk associated with solid precipitation rest potential (e.g. risk of plugging of equipment or formation of hotspots).

The data relating to wax precipitation versus temperature may comprise a remaining wax potential at increasing dT (where dT is the difference between the outlet temperature and the lowest ambient temperature of a cooling medium through which the subsea fluid conduit passes). The remaining wax potential may be calculated, and/or may be determined from testing of a relevant hydrocarbon fluid and its measured wax precipitation with temperature.

The hydrate precipitation data based on a pressure volume and temperature (PVT) model may comprise simulated or calculated data, and may be determined on a model assumption that all or significant proportion of free water contained in the fluid will form hydrates with gas released during transport and/or decreases in pressure.

The operational risk associated with solid precipitation rest potential may be a risk based on factors including operator risk philosophy, and the presence or availability of other mitigations (for example whether a shut-in chemical system or particle seeding system is available).

The second temperature may be greater than a lowest ambient temperature of a cooling medium through which the subsea fluid conduit passes by an amount in the range of 1 degrees C. to 12 degrees C.

The second temperature may be greater than or equal to 1 degrees C. above the lowest ambient temperature. The second temperature may be in the range of 1 degrees C. to 12 degrees C. above the lowest ambient temperature. In embodiments of the invention, the second temperature is in the range of 2 degrees C. to 10 degrees C. above the lowest ambient temperature. In embodiments of the invention, the second temperature is in the range of 2 degrees C. to 4 degrees C. above the lowest ambient temperature.

Embodiments of the tenth aspect of the invention may comprise features of the first to ninth aspects of the invention or their embodiments, and vice versa.

According to an eleventh aspect of the invention, there is provided a method of cooling a flowing fluid in a subsea hydrocarbon flow system using a heat exchange cooler apparatus located subsea upstream of a subsea fluid conduit, the method comprising:

flowing the fluid through the heat exchange cooler from a cooler inlet to a cooler outlet to cool the fluid from a first temperature to a second temperature at the cooler outlet; and flowing the fluid from the cooler outlet to the subsea fluid conduit;

wherein the cooling of the fluid in the heat exchange cooler apparatus precipitates at least one solid from the flowing fluid between the cooler inlet and the cooler outlet;

and wherein second temperature is sufficiently low that the fluid is stable on entering the subsea fluid conduit with negligible rest potential for precipitation of the at least one solid on a surface of the subsea fluid conduit;

and wherein the second temperature is greater than a lowest ambient temperature of a cooling medium through which the subsea fluid conduit passes by an amount in the range of 1 degrees C. to 12 degrees C.

The second temperature may be greater than or equal to 1 degrees C. above the lowest ambient temperature. The second temperature may be in the range of 1 degrees C. to 12 degrees C. above the lowest ambient temperature. In embodiments of the invention, the second temperature is in the range of 2 degrees C. to 10 degrees C. above the lowest ambient temperature. In embodiments of the invention, the second temperature is in the range of 2 degrees C. to 4 degrees C. above the lowest ambient temperature.

Embodiments of the eleventh aspect of the invention may comprise features of the first to tenth aspects of the invention or their embodiments, and vice versa.

According to a twelfth aspect of the invention, there is provided a heat exchange cooler for a hydrocarbon flow system, the heat exchange cooler comprising a cooler conduit having a cooler inlet and a cooler outlet, and a plurality of temperature sensors distributed along a length of the cooler conduit between the cooler inlet and the cooler outlet.

According to a thirteenth aspect of the invention, there is provided a computer-implemented method of determining design parameters of a hydrocarbon cooler system, the method comprising:

inputting data into a computer processor, the data comprising data relating to a fluid to be cooled and ambient conditions of the environment in which the cooler is to be used;

identifying a target outlet temperature for the cooler system;

running a simulation of a heat exchange cooler on a computer, the simulation using at least some of the input data;

deriving from the simulation at least one cooler design parameter for the identified target outlet temperature.

According to a fourteenth aspect of the invention, there is provided a computer-implemented method of determining design parameters of a hydrocarbon cooler system, the method comprising:

inputting data into a computer processor, the data relating to a fluid to be cooled, solid precipitation characteristics for the fluid to be cooled, and ambient conditions of the environment in which the cooler is to be used;

running a simulation of a heat exchange cooler on a computer, the simulation using at least some of the input data, to model a cooler temperature profile with respect to cooler length;

using the solid precipitation characteristics in combination with the modelled cooler temperature profile to determine at least one cooler design parameter and a target outlet temperature.

The at least one cooler design parameter may be a geometrical design parameter, and may be selected from the group comprising cooler length, cooler conduit cross section shape, cooler cross section dimensions, cooler cross section wall thickness, or number of parallel coolers.

The at least one cooler design parameter may be a material design parameter, and may be cooler wall material.

The input data may comprise a permissible and/or desired maximum differential pressure across the cooler system. The maximum differential pressure (dP) may be indicative of a maximum permissible or desired build-up of deposits in the cooler system, and/or a maximum acceptable pressure drop in the context of the flow system as a whole.

The input data may comprise a permissible and/or desired output temperature range, for example an acceptable range for the operation of downstream equipment.

According to a fifteenth aspect of the invention, there is provided a hydrocarbon cooler designed by the process of the thirteenth or fourteenth aspects of the invention.

According to a sixteenth aspect of the invention, there is provided a method of manufacturing a hydrocarbon cooler apparatus, the method comprising carrying out the computer-implemented method according to the thirteenth or fourteenth aspects of the invention, and manufacturing the cooler apparatus according to the determined at least one design parameter.

According to a seventeenth aspect of the invention, there is provided a hydrocarbon cooler constructed according to the sixteenth aspect of the invention.

Embodiments of the twelfth to seventeenth aspects of the invention may comprise features of the first to eleventh aspects of the invention or their embodiments, and vice versa.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

The invention in its various aspects has particular application to the design, configuration, manufacture and operation of a hydrocarbon cooler system for use below the surface of the sea to cool fluid produced from a subsea well, and accordingly the following description relates to subsea applications in which the cooler system is disposed on the seabed with seawater as the cooling medium in the heat exchange system. However, the invention also has application to cooler systems in other environments, including topsides or onshore active or passive cooler systems such as those on unmanned wellhead platforms ("UWPs"), in which other fluids including air may be the cooling medium in the heat exchange system. The cooling medium in the heat exchange system may be water, air, or any another cooling fluid such as glycol.

Figure 1:
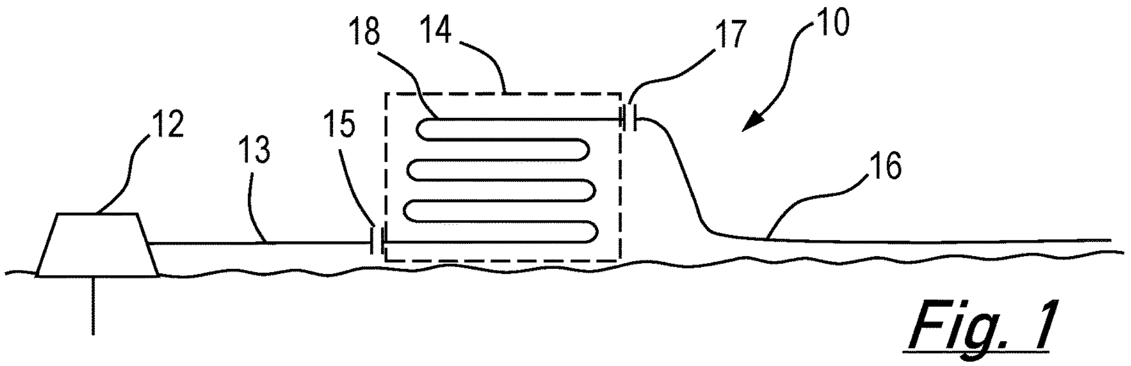
FIG. 1 is a schematic representation of a hydrocarbon cooler system designed or operated in accordance with an embodiment of the invention.

Referring firstly to FIG. 1, there is shown generally at 10 a hydrocarbon flow system comprising a subsea wellhead 12, a cooler apparatus 14, and an export flowline 16. The system 10 transports fluids produced from a subsea well to a Floating Production, Storage and Offloading vessel, platform or other production facility (which may be offshore or onshore). The system 10 may optionally include an oil/water separator (not shown), with water separated from the fluid by the separator being discharged, transported, or reinjected into the reservoir. Produced fluids pass from the wellhead 12 to the cooler apparatus 14 via the cooler inlet conduit 13.

The cooler apparatus comprises a heat exchange conduit 18, in fluid communication with inlet conduit 15 and the export flowline 16. The heat exchange conduit 18 has a Nominal Pipe Size of 3 inches and an outer diameter of approximately 89 mm, and in this embodiment is formed from a standard carbon steel material. Other suitable dimensions include Nominal Pipe Size 2 to 6 inches (outer diameters in the range of around 60 mm to 168 mm), and suitable materials include stainless steels, titanium, and other thermally conductive materials. The materials used may also be electrically conductive (e.g. where used in conjunction with inductive heating cleaning methods as described below), or may be electrically insulating or non-conductive, such as in polymer or composite pipe systems where inductive cleaning is not required in the system. The total length of the heat exchange conduit 18 can typically be in the range of 200 m to 2000 m.

The fluid in the cooler inlet conduit 13 typically has a temperature higher than the ambient temperature of the subsea environment, and will cool as it flows to the production facility, with a tendency to precipitate solids such as waxes and hydrates during its transport, at risk to flow assurance. In this example, the cooler apparatus 14 is designed for a Cold Flow application; the hydrocarbon product is cooled to a temperature sufficiently low to precipitate wax and hydrate within the cooler such that fluid entering the export flowline does not have potential for further formation of wax and hydrate.

Figure 2:
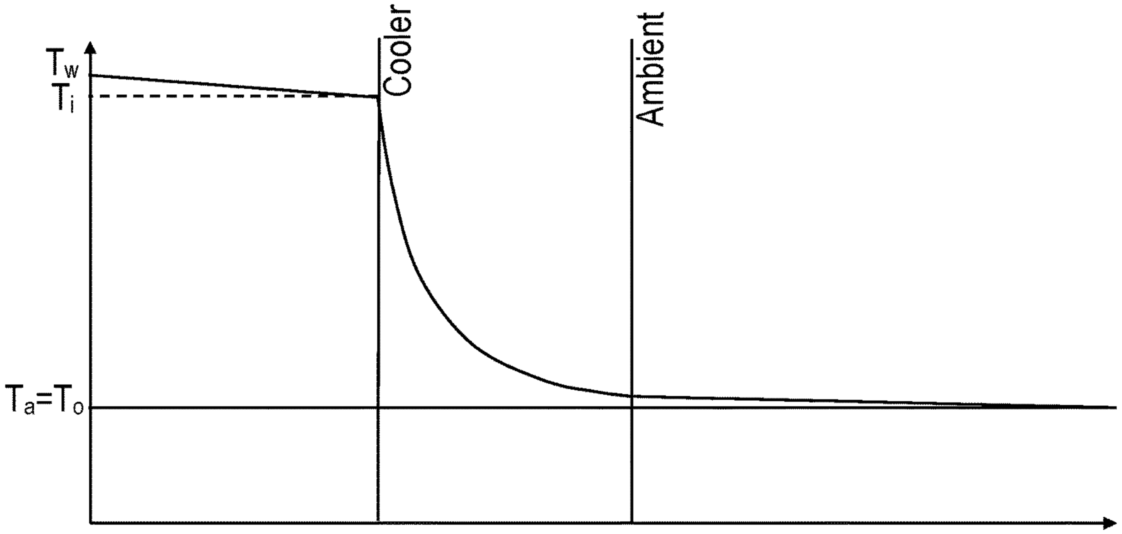
Fig. 2 (Prior Art)
FIG. 2 is a graphical representation of the temperature of a fluid flowing in the system of FIG. 1 in a conventional Cold Flow application.

FIG. 2 is a graphical representation of the temperature of a fluid flowing in the system of FIG. 1, according to a conventional mode of operation (note that the axes are not scaled and are not linear). The produced fluids flow from the wellhead at temperature $T_w$ and cooled as they flow in the conduit 13 towards the cooler apparatus 14. At an inlet 15 of the cooler apparatus 14, the fluid has cooled to a temperature $T_i$, and as fluid flows through the cooler apparatus, the temperature follows a characteristic cooler curve. At the outlet 17, the temperature of the fluid has dropped to $T_o$, and the fluid flows out of the cooler and into the export flowline 16. This mode of operation is a cold flow system, in which the cooler apparatus is designed to cool the flowing fluid to a temperature at or close to the ambient temperature $T_a$ of the medium (in this case seawater) in which the export flowline 16 is located. By cooling the fluid close to ambient temperature, additional cooling of the fluid during transportation in the flowline 16 is negligible, and therefore additional precipitation of solids on the flowline is negligible. All of the precipitation of solids is within the cooler apparatus, and is managed by cleaning, treatment, or other known means. However, cooling the fluid down to near-ambient temperature of the seawater will require large-scale cooler apparatus to fully cool the flowing hydrocarbons. The length required to cool the fluid the last few degrees is disproportionally high, as the thermal flux per metre lowers as the temperature gets closer to ambient. This limits the cooler system's economic and/or technical feasibility due to the high capital expenditure and operational burden of maintaining and cleaning the cooler.

Figure 3:
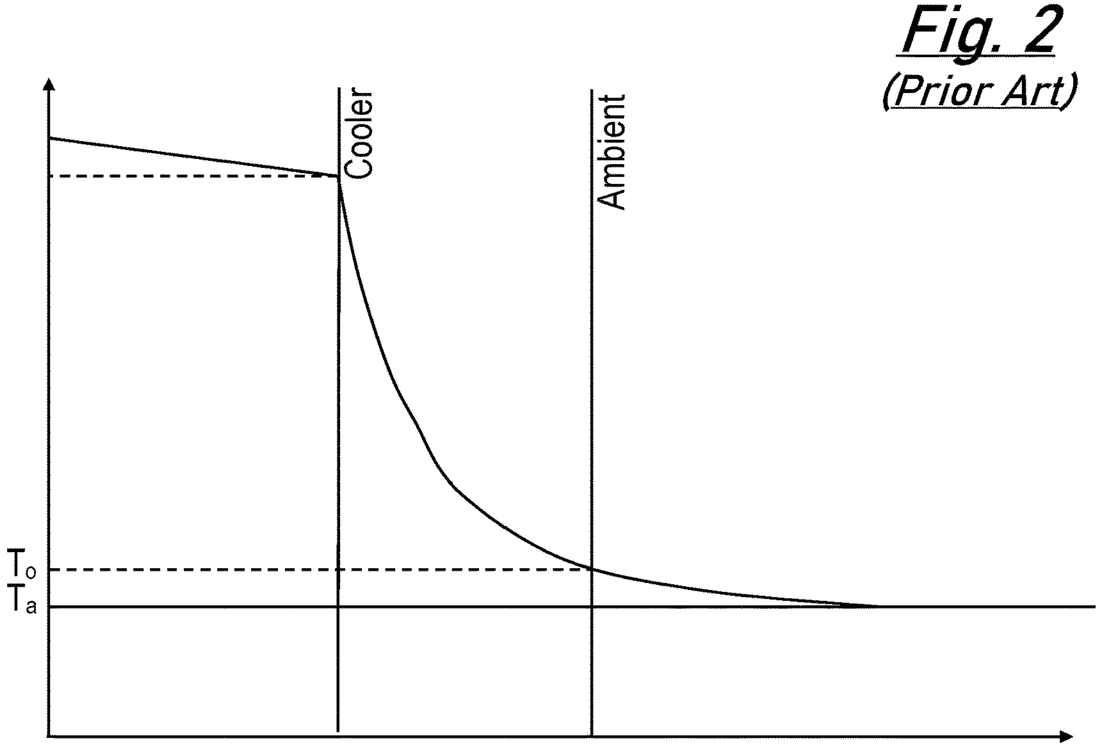
FIG. 3 is a graphical representation of the temperature of a fluid flowing in the system of FIG. 1 in a Cold Flow application, according to an embodiment of the invention.

FIG. 3 is a is a graphical representation of the temperature of a fluid flowing in the system of FIG. 1, according to the novel mode of operation of the invention (note that the axes are not scaled and are not linear). At the outlet 17, the temperature of the fluid has dropped to $T_o$, and the fluid flows out of the cooler and into the export flowline 16. In this embodiment, the cooler apparatus is designed to cool the flowing fluid to an exit temperature $T_o$, which is "cold enough", and which may be significantly above $T_a$ the ambient temperature $T_a$ of the medium (in this case seawater) in which the export flowline 16 is located.

Conventional wisdom for a Cold Flow application is to cool the flowing fluid to or very near to the ambient temperature, to prevent further precipitation of solids from the fluids during transport. However, it is feature of this invention that the benefits of a Cold Flow system can be realised without cooling the flowing fluid down to a temperature close to the ambient temperature, and thus the cooler design (and in particular the cooler size and length) can be selected to provide sufficient cooling for the fluid with reduced capital expenditure and operational burden.

Figure 4:
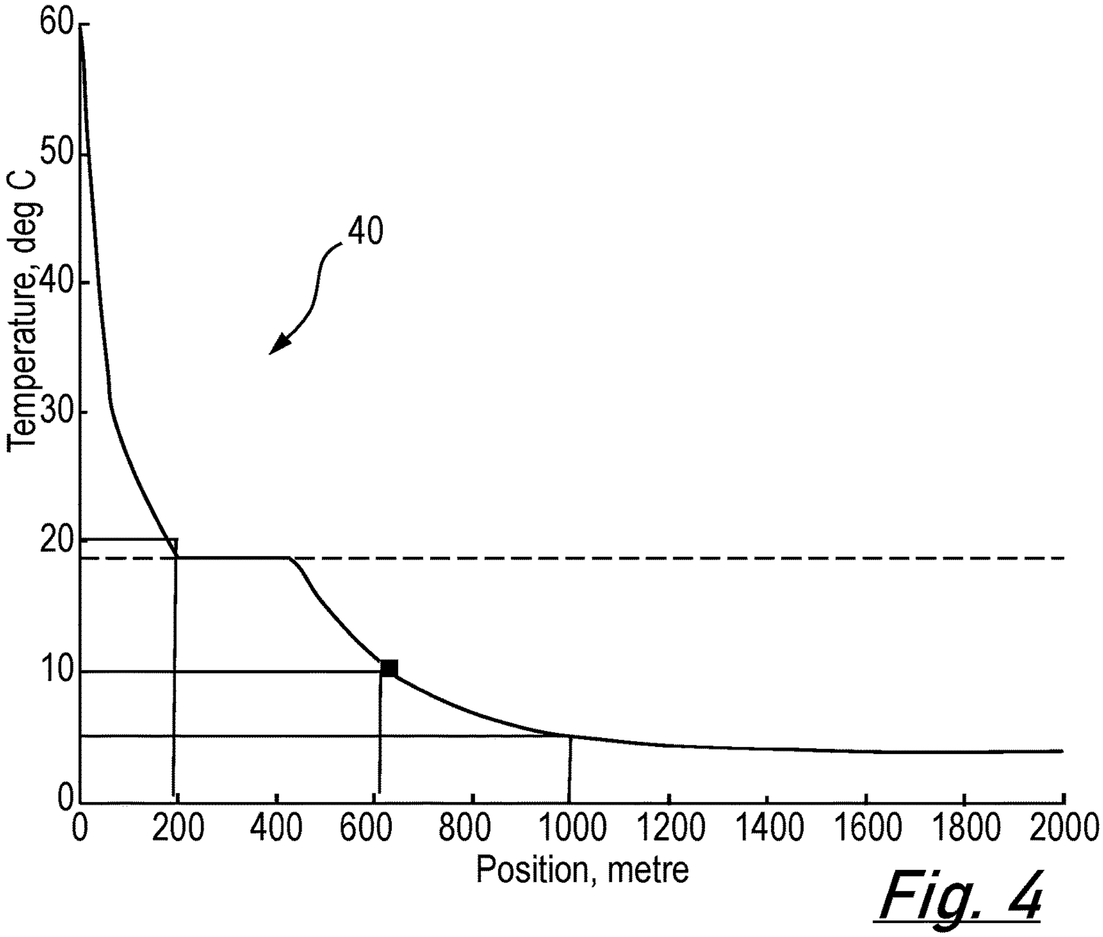
FIG. 4 is a graphical representation of the temperature of a fluid flowing in a typical hydrocarbon cooler system against cooler position, useful for understanding the invention.
Figure 5:
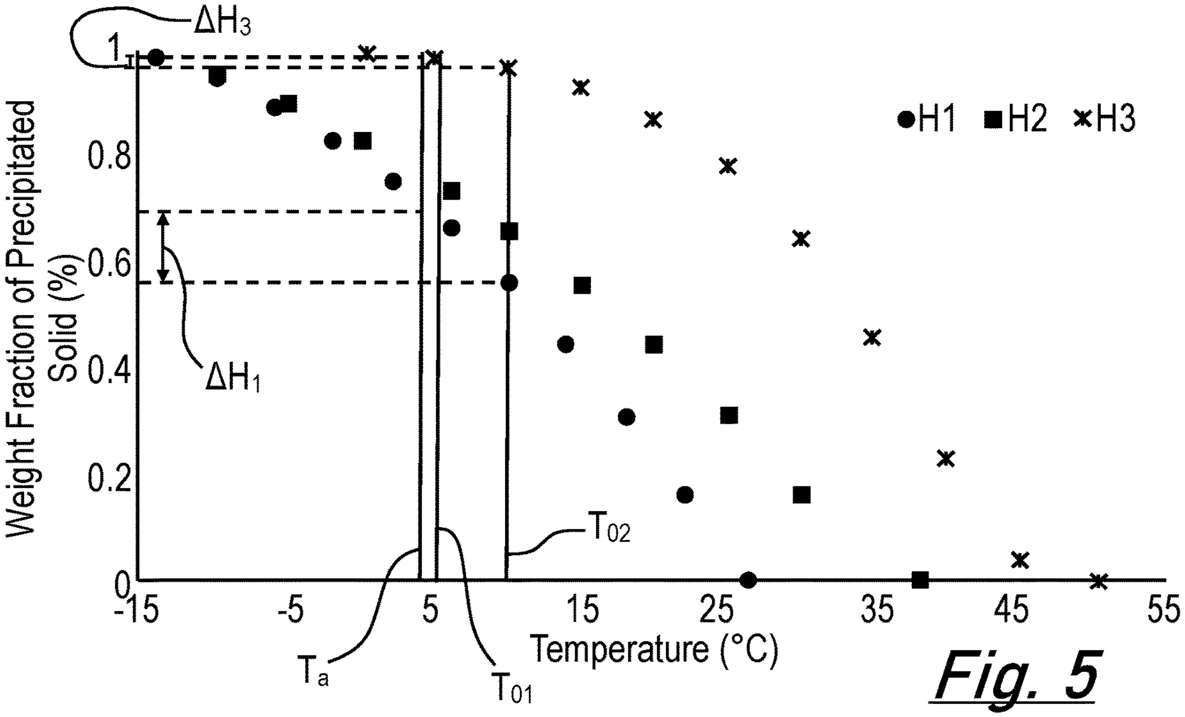
FIG. 5 is a graphical representation of solid precipitation against temperature for three hydrocarbon fluids flowing in a hydrocarbon cooler system, useful for understanding the invention.

FIGS. 4 and 5 are graphs useful for understanding the invention, and in particular illustrating the significance of providing a cooler apparatus for a cold flow system to cool the fluid only to a temperature sufficiently low enough for the flow assurance application, without being cooled to (or very near to) an ambient temperature. FIG. 4 is a graphical representation of the temperature of a fluid flowing in a typical hydrocarbon cooler system against cooler position, and FIG. 5 is a graphical representation of solid precipitation against temperature for three hydrocarbon fluids flowing in a hydrocarbon cooler system.

FIG. 4 shows a computer modelled cooling curve 40 for a cooler apparatus having the following characteristics: a 76 mm (3 inch) outer diameter pipe formed from x52 sch80 (carbon steel); a 0.5 mm wax layer deposited on the inner wall of the cooler after the Wax Appearance Temperature (WAT) is reached; an inlet temperature of 60 degrees C.; a water cut of 5%; oil fluid flow, with no free gas; and an ambient cooling water temperature of 4 degrees C. The model shows a relatively steep cooling curve in the first 200 m of the heat exchange conduit, followed by a plateau in the curve at around 200 m to 440 m, which corresponds to exothermic reactions at the Hydrate Equilibrium Temperature (HET) of around 18.5 degrees C. From around 440 m the curve begins to flatten towards the ambient temperature of 4 degrees C.

The modelled curve shows that for a 20 degrees C. outlet temperature, the required length of cooler $L_1$ is 200 m. For a 5 degrees C. outlet temperature, the required length of cooler $L_3$ is 1000 m. However, for a 10 degrees C. outlet temperature, the required length of cooler $L_2$ is only 600 m. Thus the cooler length could be reduced by 40% if an increase of outlet temperature from 5 degrees C. to 10 degrees C. is acceptable in the context of the overall flow system.

FIG. 5 illustrates that such increases in outlet temperature can be acceptable in a Cold Flow system for certain fluid compositions. FIG. 5 plots percentage weight of solid precipitation from three hydrocarbon fluids H1, H2, H3 against temperature. The data show that between outlet temperatures $T_{O1}$ of 5 degrees C. or $T_{O2}$ of 10 degrees C., and the ambient temperature $T_a$ of 4 degrees C., there is potential for further solid precipitation from the fluid as it cools in the flowline from the outlet temperature to the ambient temperature. In the case of an outlet temperature $T_{O1}$ of 5 degrees C., the potential is small for fluids H1, H2, and H3, and may be acceptable. I.e. the potential for further solid precipitation in the fluid during flow from the cooler is manageable.

The data also show that at a temperature $T_a$ of 4 degrees C., fluid H3 has a precipitated solid weight of around 1.00%, whereas at a temperature $T_{O2}$ of 10 degrees C., fluid H3 has a precipitated solid weight of around 0.98%. Therefore an outlet temperature of 10 degrees C. would result in potential precipitated solids of around 0.02% points of solids by weight. This increase may be manageable in the export flowline—the remaining precipitation potential volume is low enough that plugging risk is negligible. Therefore an increase in outlet temperature from 5 degrees C. to 10 degrees C., with the resulting reduction in length of the cooler (by 40% in the model of FIG. 4), will be an acceptable design choice when the attendant benefits of reduced capital expenditure and operational burden are accounted for.

In addition, as will be described below, the cooler system may optionally be used in conjunction with particle seeding and/or a cleaning system to create particles or nuclei in the flow. Particle seeding returns a proportion of the cooled fluid, which contains solid particles in the fluid, back to a location further upstream. The seeding process will provide dry stable hydrate particles in the flow, which will facilitate the in-bulk formation of solids. The cleaning process will cause deposits of solid materials to be dislodged as particles, which may be in the form of flakes, into the flowing fluid. Where there are nuclei in the flow, almost all of this little remaining precipitation potential will be manifested as precipitation formed in the bulk flow, rather than as deposits on the conduit walls and other surfaces of the flow system, and hence will have zero or negligible plugging risk.

In contrast, the data show that at a temperature of 4 degrees C., fluid H1 has a precipitated solid weight of around 0.72%, whereas at a temperature of 10 degrees C., fluid H1 has a precipitated solid weight of around 0.6%. Therefore an outlet temperature of 10 degrees C. would release an additional approximately 0.12% points of solids by weight. This increase may not be manageable in the export flowline—over time this will amount to significant volumes. Therefore an increase in outlet temperature from 5 degrees C. to 10 degrees C., may not be an acceptable design choice for fluid H1.

The data show that for fluid composition H2, the results are intermediate between those of H1 and H3, and the acceptability of the increase in solid precipitation may be assessed depending on a range of technical and commercial factors.

Figure 6A:
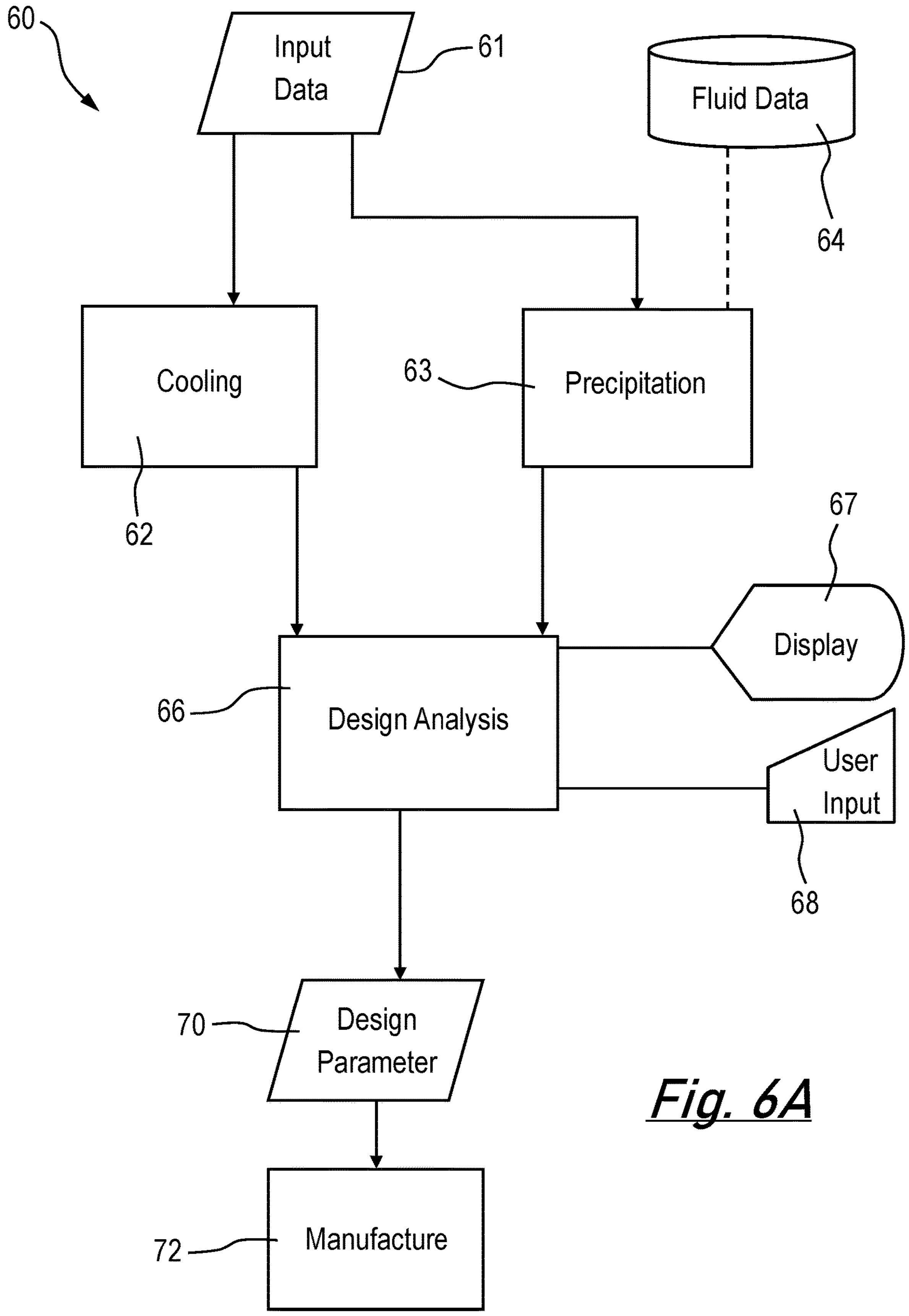
FIG. 6A is a schematic block diagram showing the steps of a method of determining a Cold Flow cooler design parameter and optionally manufacturing a hydrocarbon cooler in accordance with an embodiment of the invention.

FIG. 6A is a schematic block diagram showing the steps of a method in accordance with an embodiment of the invention. The method, generally shown at 60, uses the principles illustrated and described with reference to FIGS. 4 and 5 to determine a design parameter for a cooler apparatus for use in a Cold Flow application, and optionally to manufacture the cooler apparatus in accordance with that design parameter. The method is carried out by a processor (not shown) and may be implemented in software. Input data 61 to the method include fluid data relating to characteristics of the fluid flowing through the cooler system (including but not limited to fluid composition, temperature, pressure and flow rate) and system data including but not limited to environmental data relating to ambient conditions in which the cooler system is to operate, and any cooler design constraints, such as material selection, geometry and/or performance data. The fluid data may be estimated or calculated based on production modelling, and/or may be determined from analysis of samples or inline fluid measurements.

The method determines cooling data (step 62) from the input data, which includes the temperature profile of the fluid flowing in the cooler with respect to position from the inlet (similar to the plot of FIG. 4 but for the input data 61). The method also provides solid precipitation data, which may be calculated from solid precipitation models based on fluid data input to the system at 61, or may be obtained from a fluid database 64, containing precipitation data relating to a range of fluid compositions and flow conditions. The cooling data and precipitation data then form a part of a design analysis step 66, which utilises the cooling and precipitation data to determine the effect of changing cooler design parameters (for example cooler length) on the outlet or exit temperature of fluid from the cooler apparatus, and therefore the effect on solid precipitation. Through known statistical optimisation methods, one or more cooler design parameters can be optimised to determine a suitable and acceptable fluid exit temperature that precipitates a sufficient proportion of solids from the flowing fluid, without cooling the fluid all the way down to ambient temperature before the fluid exits the cooler, and without leaving a potential for solid precipitation in the export flowline that cannot be managed.

The precipitation data may include data relating wax precipitation to temperature, for example the remaining wax potential at particular dT, where dT is the difference between the outlet temperature and the lowest ambient temperature of a cooling medium through which the subsea fluid conduit passes. The remaining wax potential may be calculated, and/or may be determined from testing of a relevant hydrocarbon fluid and its measured wax precipitation with temperature. Where hydrates are concerned, the precipitation data may include hydrate precipitation data based on pressure volume and temperature (PVT) modelling. The modelling may for example include a model assumption that all or a significant proportion of free water contained in the fluid will form hydrates with gas released during transport and/or decreases in pressure. The method may also take account of operational risk associated with solid precipitation rest potential (e.g. risk of plugging of equipment or formation of hotspots), and may include factors such as operator risk philosophy, and the presence or availability of other mitigations (for example whether a shut-in chemical system or particle seeding system is available).

The method may optionally include the steps of displaying design parameter information to an operator of the system (step 67) and/or receiving user input to select design options or constrain the design process (step 68). The selected design parameter (for example, cooler length) is output (step 70) as part of a final cooler design. A cooler apparatus may then be manufactured in accordance with the design (step 72), although it will be appreciated that manufacture of the apparatus may be done at a later time and/or in a different geographical location based on the output design parameters.

It should be appreciated that although the steps 62 and 63 are shown in FIG. 6A as being performed in parallel, they could also be carried out sequentially (in no particular order).

Whilst the foregoing description relates to Cold Flow applications, in which the objective is to cool the flowing fluid to a temperature sufficiently low that the rest potential for precipitation of solids and clogging of flow lines and downstream equipment is negligible, the invention also has application to other cooler applications, including step cooler systems. In a step cooler system, a flowing fluid is cooled in order to protect downstream equipment from fluid temperatures that exceed their optimum operating range, or to mitigate or compensate for a process that has introduced heat into the fluid. Typical examples include subsea or topsides equipment for separation, boosting, and compression. Such equipment typically has a preferred or required fluid inlet temperature for required performance and/or avoiding damage or degradation.

Figure 7:
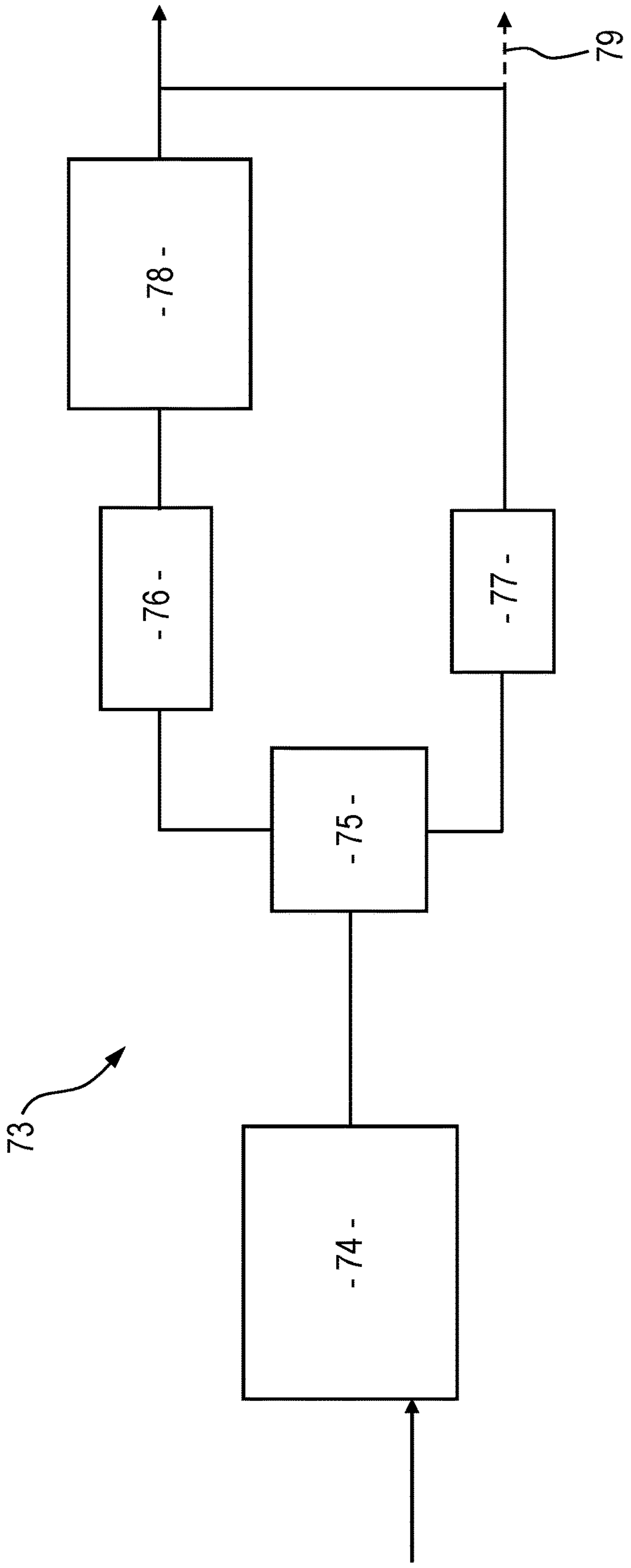
FIG. 7 is a schematic representation of a subsea compression system, useful for understanding an embodiment of the invention.

FIG. 7 is an example of an application of step coolers in a subsea compression system, in which the produced fluid is predominately hydrocarbon gas. The system, generally shown at 73, comprises an inlet cooler 74 that receives production fluid from a pipeline. The inlet cooler 74 is a step cooler that lowers the temperature of the flowing fluid before it flows to a scrubber 75, which separates hydrocarbon gas from condensates. The scrubber 75 has an optimal temperature range for the inflowing fluid, and the inlet cooler is designed to cool the fluid to a temperature within that range. Gas from the scrubber 75 flows to a compressor 76, and condensates flow from the scrubber 75 to a pump 77. The temperature rise resulting from the compression of the gas is compensated for by a discharge cooler 78, before the compressed gas is discharged from the system to an export flow line (the condensates may be discharged through the export flowline or through a dedicated flowline 79).

Step coolers are required to cool the flowing fluids to a target temperature, although not necessarily remove all or a majority solids from the fluid or the potential for solid crystallisation in contrast to conventional Cold Flow applications, and the target temperature may be significantly above the ambient temperature. However, the relatively cool pipe walls will cause wax deposits to be formed on the inner walls. Additionally, the target temperature may be around or below the WAT or HET, causing solid deposits will tend to form in the cooler. Such deposits will reduce the cooling performance of the cooler, as the solid deposits are thermally insulating and reduce heat-exchange efficiency. The reduced performance due to internal deposits contributes to the "fouling factor", which also accounts for reduced performance due to the presence of external debris and/or marine growth on the outside of the cooler. In conventional applications of step coolers in the transportation and processing of hydrocarbons such as that shown in FIG. 7, the effect of the fouling factor and/or flow assurance risks are typically mitigated by the use of chemical inhibitors with chemicals such as mono-ethylene glycol (MEG).

Step coolers are typically designed and manufactured with a design margin, which takes account of the reduced performance (fouling factor) of the cooler when it is in an unclean condition with deposits formed in the cooler and the presence of external deposits and/or debris. Therefore to operate effectively and provide the required outlet temperature for the cooled fluid in all operating conditions, the step cooler is designed with an over-capacity when in its clean condition, and cools the fluid to a lower outlet temperature than is necessary when clean. The initial design margin may be in the region of 20% to 30%, but reduces during operation of the cooler as it becomes fouled. This initial over-capacity increases the cost and size of the step cooler.

Objectives of aspects of the invention include provide a cooler apparatus that is suitable for use in transportation and processing of hydrocarbons that does not rely on chemical treatment processes for flow assurance and/or fouling factor mitigation, and enables a design margin of a cooler to be reduced. Such an objective can be realised according to the invention by optimising one or more design parameters of the cooler (for example with reference to FIG. 6B), and/or by incorporating additional features that facilitate verification and/or monitoring of cooler operations (for example with reference to FIG. 8).

Figure 6B:
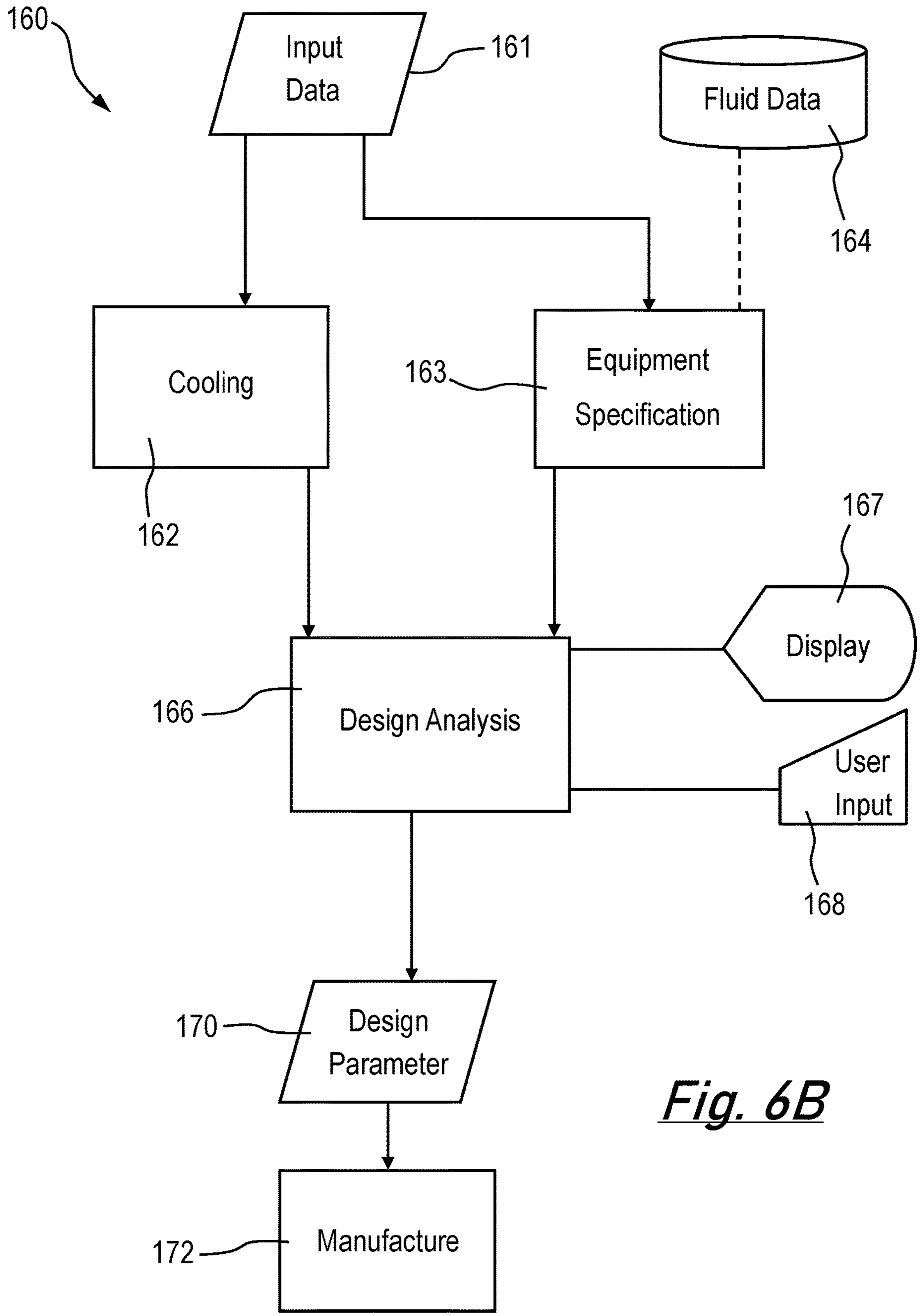
FIG. 6B is a schematic block diagram showing the steps of a method of determining a step cooler design parameter and optionally manufacturing a hydrocarbon cooler in accordance with an embodiment of the invention.

FIG. 6B is a schematic block diagram showing the steps of a method in accordance with an embodiment of the invention as applied to a general cooler system. The method, generally shown at 160, is similar to the method 60 and will be understood from FIG. 6A and the accompanying description. The method 160 differs from the method 60 in that it is used to determine a design parameter for a cooler apparatus for general use, for example a subsea cooler located upstream of an item of equipment in a hydrocarbon processing or transportation system (rather than in a Cold Flow application), and optionally to manufacture the cooler apparatus in accordance with that design parameter. The method is carried out by a processor (not shown) and may be implemented in software. Input data 161 to the method include fluid data relating to characteristics of the fluid flowing through the cooler system (including but not limited to fluid composition, temperature, pressure and flow rate) and system data including but not limited to environmental data relating to ambient conditions in which the cooler system is to operate, and any cooler design constraints, such as material selection, geometry and/or performance data. The fluid data may be estimated or calculated based on production modelling, and/or may be determined from analysis of samples or inline fluid measurements.

The method determines cooling data (step 162) from the input data, which includes the temperature profile of the fluid flowing in the cooler with respect to position from the inlet (similar to the plot of FIG. 4 but for the input data 161).

Whereas the method 60 used solid precipitation data 61, the objective of the method 160 is to optimise the design parameter of the cooler to the technical specification of an item of equipment (e.g. a gas scrubber) that is downstream of the cooler, and therefore the method 160 uses equipment specification data 163. The equipment specification data may include (but are not limited to) necessary or desirable temperature ranges for a fluid inflowing to the equipment, necessary or desirable characteristics of a cooler cleaning regime, and/or necessary or desirable characteristics of a maintenance regime for the equipment (which may be dependent on fluid temperature). The input data may for example include a permissible and/or desired maximum differential pressure across the cooler system. The maximum differential pressure (dP) may be indicative of a maximum permissible or desired build-up of deposits in the cooler system, and/or a maximum acceptable pressure drop in the context of the flow system as a whole. The input data include a permissible and/or desired output temperature range, for example an acceptable range for the operation of downstream equipment.

The cooling data and equipment data then form a part of a design analysis step 166, which utilises the cooling and equipment data to determine the effect of changing cooler design parameters (for example cooler length) on the outlet or exit temperature of fluid from the cooler apparatus, and therefore the effect on solid precipitation. Through known statistical optimisation methods, one or more cooler design parameters can be optimised to determine a suitable and acceptable fluid exit temperature that is appropriate for the operation of the equipment.

The method may optionally include the steps of displaying design parameter information to an operator of the system (step 167) and/or receiving user input to select design options or constrain the design process (step 168). The selected design parameter (for example, cooler length) is output (step 170) as part of a final cooler design. A cooler apparatus may then be manufactured in accordance with the design (step 172), although it will be appreciated that manufacture of the apparatus may be done at a later time and/or in a different geographical location based on the output design parameters.

It should be appreciated that although the steps 162 and 163 are shown in FIG. 6B as being performed in parallel, they could also be carried out sequentially (in no particular order).

Figure 8:
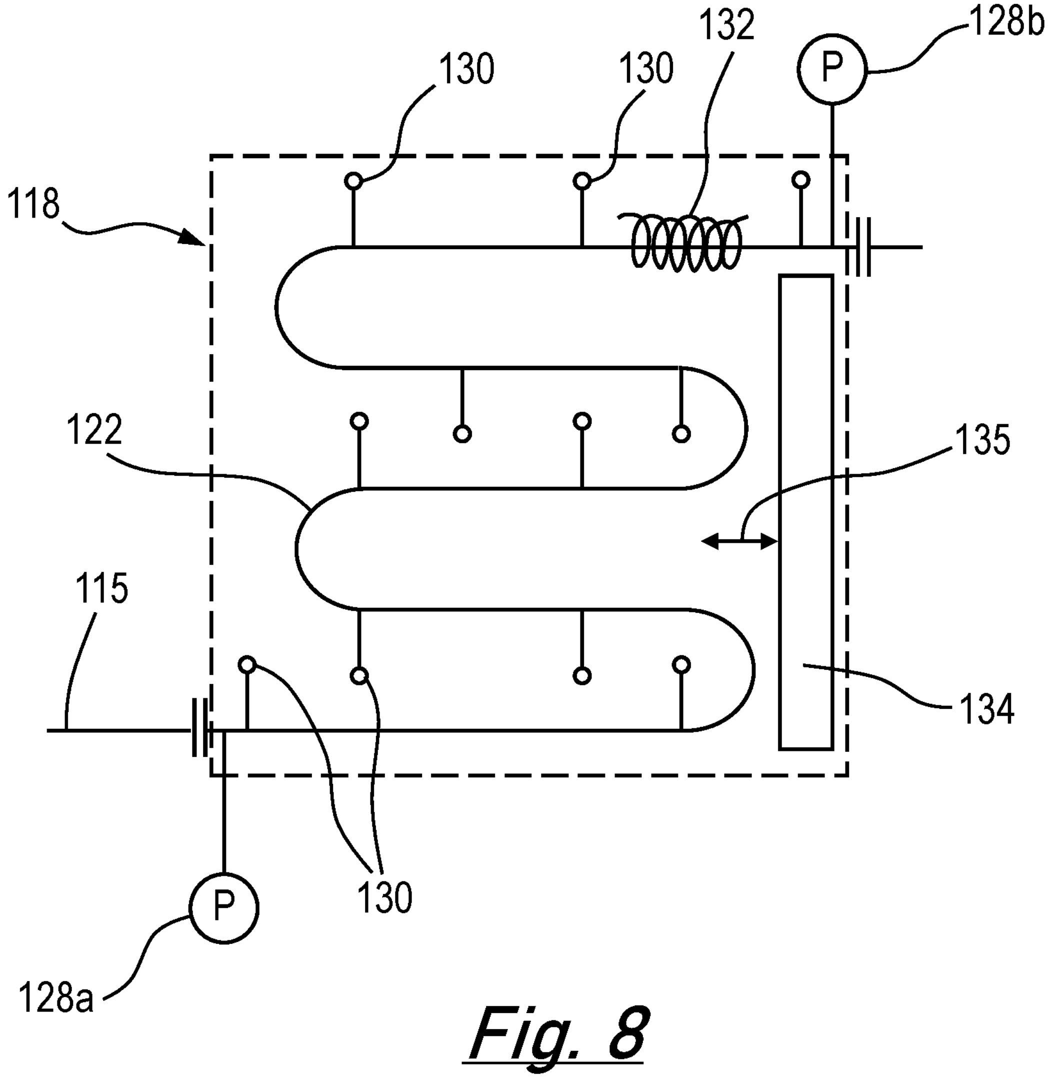
FIG. 8 is a schematic representation of a cooler apparatus in accordance with an embodiment of the invention.

FIG. 8 is a schematic representation of a subsea hydrocarbon cooler system in accordance with an embodiment of the invention, having additional features that facilitate verification and/or monitoring of cooler operations. The cooler apparatus, generally shown at 118, is applicable to a Cold Flow system and a general cooler system such as a step cooler in a hydrocarbon transportation and/or processing system.

The cooler apparatus 118 receives fluid from an inlet conduit 115 and cooled fluid exiting from the apparatus enters a conduit 119 or an item of processing equipment.

In a Cold Flow system, the conduit 119 may transport fluids produced from a subsea well to a Floating Production, Storage and Offloading vessel or other production facility (which may be offshore or onshore), and may be downstream of a subsea wellhead and optionally an oil/water separator (not shown). In a general cooler application, the conduit 119 may fluidly couple the cooler to an item of processing equipment, such as equipment for separation, boosting, and/or compression.

The cooler apparatus 118 is also provided with a cleaning system 134 which functions to remove deposits of precipitated solids from the inner walls of the conduit system. In this example, the cleaning system may comprise one or more modules movable (as represented by the arrows 135) to translate along the exterior of the heat exchange conduit in one, two, or three dimensions, and heat the conduit by induction heating. Heating of the conduit causes heating and melting of the contact surface wax deposits on the inner walls of the conduits, to dislodge the deposits as solid particles such as flakes into the bulk flow of the fluid. The cleaning system optionally includes means for cleaning the exterior of the conduits (e.g. removal of fouling), such as water jetting, brushes or scrapers, as the conduits are passed. An example of a suitable cleaning system is described in the applicant's patent publication number WO 2015/062878, although the apparatus and methods of the invention are suitable for use with any of a range of cleaning systems. Examples of possible cleaning systems include cleaning systems located externally of the conduits of the cooler apparatus to be cleaned. For example, the cleaning system may comprise inductive heating elements, electrical trace heating elements, and/or hot fluid trace heating conduits located externally of the conduits to be cleaned.

Alternatively, or in addition, the cleaning system may comprise a hot fluid flushing system, configured to direct a relatively hot fluid (for example hot oil) through conduits to be cleaned in order to remove deposits of precipitated solids from the inner walls of the conduits, internal electrical trace heating elements, internal hot fluid trace heating conduits, or pipe-in-pipe flow systems.

In a preferred implementation of the cleaning system, cleaning of the conduits is cyclical. In this example, the movable inductive heating module undergoes regular or irregular, repeated reciprocating motion over the cooler apparatus to heat and dislodge solid deposits as the heating apparatus moves along the conduit system.

The design parameter optimisation methods of the present invention provide greater flexibility in the choice of cleaning regime and/or the way a cleaning system is operated. For example, the frequency of cleaning operations can be reduced, and/or a lower impact cleaning system may be used. Reducing cleaning frequency will reduce power consumption will reduce the operating expense of the system, and may also reduce maintenance costs of the cleaning system due to reduced wear on the equipment used.

The cooler apparatus 118 is designed in accordance with the principles of the methods 60 or 160, and is optimised to provide appropriate cooling of the fluid for the intended application. The cooler apparatus comprises a heat exchange conduit 122, in fluid communication with inlet conduit 115 and an outlet conduit. The heat exchange conduit 122 has a Nominal Pipe Size of 3 inches and an outer diameter of approximately 89 mm, and in this embodiment is formed from a standard carbon steel material.

The cooler apparatus of this embodiment is provided with sensors which enable verification and/or monitoring of performance. Such verification and monitoring may be particularly desirable for operators, because an optimised cooler apparatus may be perceived as having reduced margins for error during operation. The cooler apparatus 118 therefore optionally comprises pressure sensors 128*a*, 128*b* (together 128) and/or temperature sensors 130. The pressure sensors 128*a* and 128*b* are respectively located at, adjacent, or near the cooler inlet conduit 115 and at, adjacent or near the outlet conduit. They are capable of measuring pressure of the fluid in the cooler conduits, and outputting pressure data to a processor (not shown). The processor may be local to the system or may be remotely located, for example as part of a subsea control module or at a surface facility. The temperature sensors 130 are distributed over the length of the heat exchange conduit and are capable of measuring the temperature of the exterior of the conduit and outputting temperature data to the processor.

The temperature data may be used as an alternative to or in addition to the pressure data. It should be appreciated that other locations of pressure and temperature sensors are within the scope of the invention. For example, pressure sensors may be located at positions along the length of conduit system, so that pressure differentials can be measured and monitored over parts of the length of the conduit. Alternatively, or in addition, embodiments of the invention may use internal temperature sensors rather than external temperature sensors as described above. As will be described further below, acquired temperature data may be used in a number of different ways, including analysing temperature changes relative to a baseline test to verify the presence of deposits, deposit rates, and cleaning efficiency.

The cooler apparatus may optionally include a formation or insertion 132 configured to disrupt the flow in at least a portion of conduit system of the cooler apparatus. The insertion may be, for example, a helical coil or swirl disposed in the heat exchange conduit, and may be designed to induce turbulence in the flow. Turbulence and fluid mixing can increase the heat exchange coefficient and therefore the effectiveness of the cooler. In addition, the turbulence and fluid mixing can increase the erosion of wax layers on the inner walls of the conduit, as the abrasiveness of solid particles in the fluid assists in wearing down any wax layers. The insertion could extend through the entire or majority of the cooler apparatus. One potential drawback is that the differential pressure over the cooler would be increased. Another is the potential for the insertion to become clogged by deposits of precipitated solids, so for certain applications (such as long subsea tie-backs), the formation may be localised to selected zones to increase the heat transfer coefficient at those areas. In other applications, such formations and insertions may be located in parts of the conduit that can be effectively cleaned, to reverse the effect of clogging, and in others, formations and insertions may be omitted.

The principles of the invention have been successfully demonstrated in an experimental set-up using a multiphase flow loop. The experimental configuration is shown generally in FIG. 9 in simplified form. The configuration 80 includes a cooler 81 comprising a 300 m long 2 inch Nominal Pipe Size pipe (60 mm outer diameter, 49 mm inner diameter) 82 located in a container 84 with circulating river water as the heat exchange medium. Pumps 85 and 86 supply hot oil and water, or oil alone, from a separator/reservoir 87 to the cooler. As the hot oil and water is cooled down, wax and gas hydrate deposits were formed on the pipe wall. A slurry with gas hydrates and wax particles passed out of the cooler. A pipe-in-pipe heat exchanger 88 connected to a steam boiler heated and reconditioned the cold slurry to reservoir temperature before the fluids were returned to the separator. The separator separated the phases, and also functioned as a fluid reservoir. (A small gas compressor was also installed to allow circulation of free gas, but it was not used in the experiments.)

The cooler was heavily instrumented with temperature and pressure sensors (not shown), and was provided with a robotic induction heating system (not shown) to remove deposition. Return lines for seeding using cold recirculated slurry were split off from just downstream of the cooler.

Downstream of the cooler, a 25 mm (1 inch) loop was provided for testing of slurry properties; a jacketed pipe-in-pipe section allowed simulation of different downstream seabed temperatures. This section could be pigged to measure any potential wax deposition quantities.

A control system (not shown) monitored all the measured parameters and regulates the fluid rates and temperatures, enabling unmanned, continuous operation of the set-up. This was connected to an alarm system that automatically shut down parts or all of the set-up if necessary. All parameters were logged continuously at a sampling rate of 2 Hz.

The experimental configuration was used to carry out several different experiments, including baseline tests with no removal of wax and hydrate deposits and system tests with cyclical induction heating.

Baseline tests were run with no particle seeding or removal of wax and hydrates during the tests, to investigate how wax and hydrate depositions would emerge in a system with no remediation. Hot fluids from the separator, with temperature between 62-65° C., entered the cooler and were cooled to 8-14° C. (depending on river water temperature). After passing through the cooler, the fluids were reheated to above 60° C. before returning to the separator. In all baseline tests, deposits were detected shortly after start-up. The pressure drop through the cooler increased, and the temperatures at the outside of the pipe wall decreased. The deposits of wax and hydrates were allowed to build up for several hours. Repetitions were performed and showed very similar results. Some of the tests were run for a longer time, until the pressure drop increased to a level where the pumps no longer were able to keep the flow rate stable. In a baseline test with both wax and hydrates, and 5% water cut, the cooler was almost plugged after 7.5 hours and completely plugged after 12 hours. In a baseline test with wax alone, the cooler was plugged after around 6 hours. After each test, the container was emptied of water and hot oil circulated to melt the deposits.

Figure 10A:
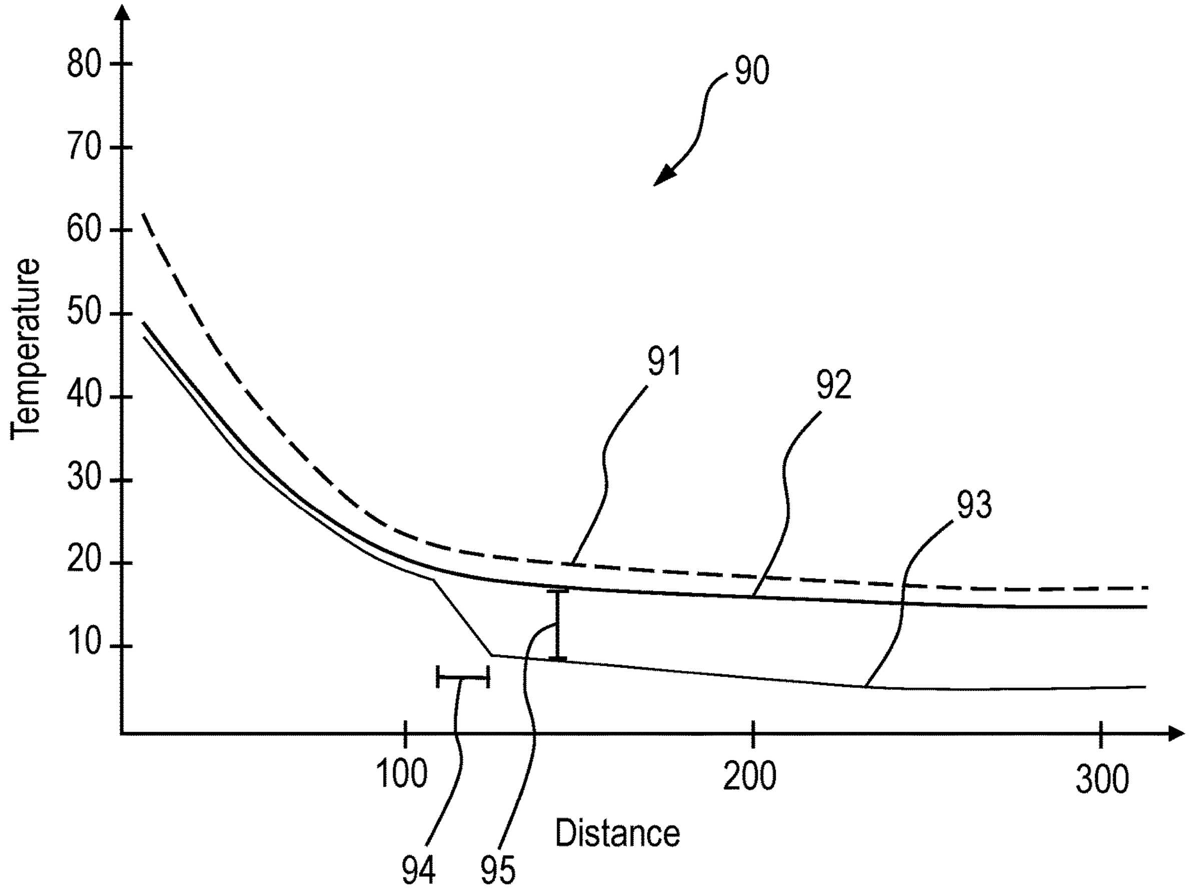
FIG. 10A is a graphical representation of a temperature along a cooler flow conduit, useful for understanding a method according to an embodiment of the invention.

Temperature data collected by the sensors may be processed to measure and optionally monitor over time the external temperature of the conduit system. FIG. 10A is a typical graphical representation, generally depicted at 90, of temperature plotted against distance from the cooler inlet. Line 91 is a plot of fluid temperature internal to the heat exchange conduit, measured using temperature sensors internal to the cooler in the experimental set up. In a practical cooler system, the internal temperature may be known from measurement, by calculation, and/or by interpolation or extrapolation from local internal temperature measurements. Line 92 is a plot of temperature external to the heat exchange conduit, as measured by external temperature sensors 30, at a time when the heat exchange conduit is clean (i.e. known to have no solid deposit layers on the inner wall of the conduit). The external temperature profile 92 follows generally the internal temperature profile 91, offset by a few degrees C. (lower than the internal temperature profile).

Line 93 is a plot of temperature external to the heat exchange conduit, as measured by the temperature sensors 30, at a time when the heat exchange conduit has solid deposit layers on the inner wall of the conduit. The external temperature profile 93 also generally follows the external temperature profile 92 in the first (approximately) 110 m of the cooler, but from around 120 m or so, the external temperature is significantly lower than the internal temperature profile and the external temperature profile 92 of the clean conduit (as indicated at 95). The decreased external temperatures 95 are indicative of reduced heat transfer through the walls of the conduit, due to build-up of thermally insulating wax and/or hydrate layers on the inner wall of the conduit. The closely-matched temperature data in the first part of the graph indicates that there is little additional thermal insulative effect in the first 110 m or so of the cooler, because build-up of solid deposits is slight, due only to wax deposits forming on the inside walls of the cooler conduit due to their relatively cold temperature. The transition 94 in the curve 93 corresponds to the wax appearance temperature WAT of around 18 degrees C. Wax deposits accumulate on the inner wall of the pipe and insulate the conduit to reduce thermal flux in the remaining length of the cooler.

In practical cooler applications, the internal fluid temperature profile, and/or the external temperature profile measured at a time that the conduit is known to be clean, can be used as a benchmark temperature. By monitoring the external temperature in relation to the benchmark temperature, build-up of solid deposits can be detected, and operation of the cooler apparatus and/or other flow assurance techniques can be adjusted or otherwise intervened with. Conversely, a stable external temperature profile can be indicative of effective operation of the system. A transition in the temperature profile (e.g. the transition 94) can be used to identify the WAT and/or the HET.

Figure 10B:
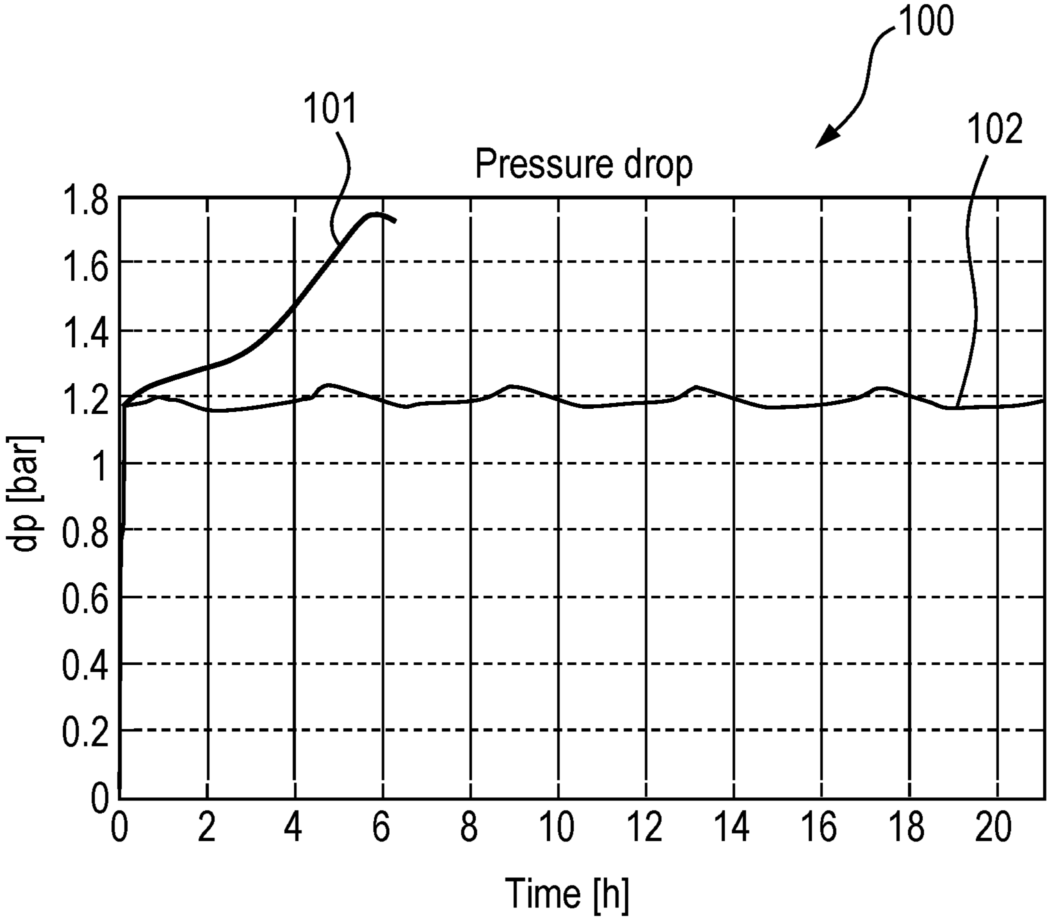
FIG. 10B is a graphical representation of a pressure differential along a cooler flow conduit, useful for understanding a method according to an embodiment of the invention.

Alternatively, or in addition, the pressure data may be processed to measure and optionally monitor over time a differential pressure over the cooler conduit system. FIG. 10B is a typical graphical representation, generally depicted at 100, of differential pressure plotted against time. Line 101 is a plot of differential pressure that shows an increase over time. An increase in the differential pressure over the cooler conduits due to a build-up of solids on the inner walls of the conduits, is indicative of sub-optimal operation of the system. Conversely, a stable differential pressure can be indicative of effective operation of the system. By monitoring the differential pressure in relation to the benchmark differential pressure or generally with respect to time, build-up of solid deposits can be detected, and operation of the cooler apparatus and/or other flow assurance techniques can be adjusted or otherwise intervened in.

Over a period of operation which includes at least one cleaning cycle, a stable pressure with no upward trend indicates that the cleaning system is able to remove deposits as fast as the deposits accumulate (although within a time period of a cleaning cycle there may be some fluctuations in pressure caused by the continuous deposition and removal of solids at different locations in the cooler). FIG. 10B line 102 shows a typical pressure drop development over a long-term test using seeding from recycled fluid in combination with induction heating in a wax-containing fluid. Some deposition can be seen from the increasing pressure drop, but after the cleaning system passed by, the pressure drop was back to the initial values. Over a long-term test, there is no upward trend in the pressure drop, indicating that the cleaning system was able to remove deposition as fast as the deposition grew. The fluctuations in line 102 are caused by the continuous deposition and removal of solids at different locations in the cooler during each cleaning cycle.

The pressure data may be used as an alternative to or in addition to the temperature data. It should be appreciated that other locations of pressure and temperature sensors are within the scope of the invention, and embodiments of the invention may use internal temperature sensors instead of, or in combination with, external temperature sensors as described above.

Figure 9:
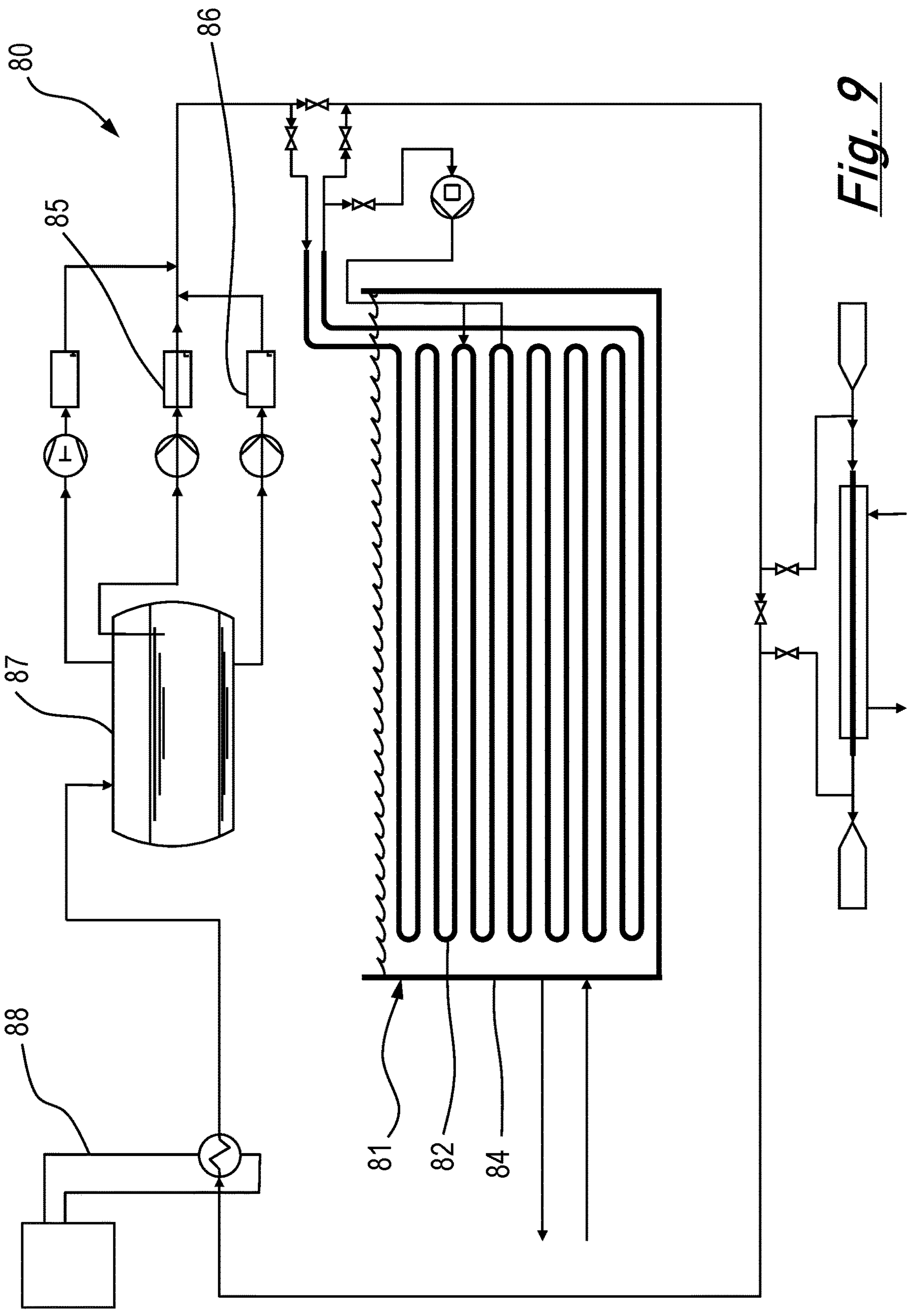
FIG. 9 is a schematic representation of an experimental configuration useful for understanding the invention.
Figure 11:
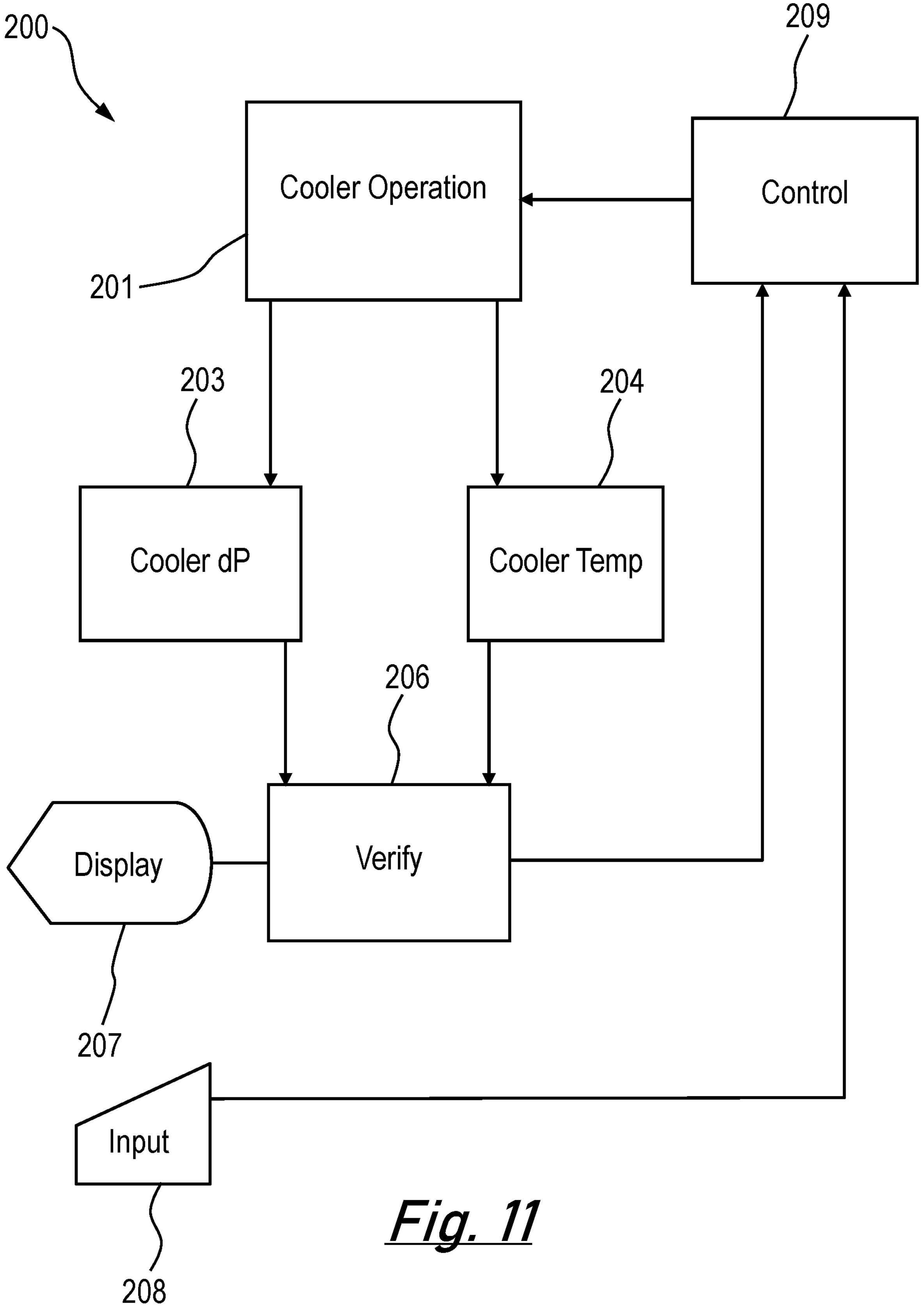
FIG. 11 is a schematic block diagram showing the steps of a method of operating a cooler according to an embodiment of the invention.

FIG. 11 is a schematic block diagram showing the steps of a method of operating a cooler according to an embodiment of the invention, utilising the principles illustrated in FIGS. 9 and 10 and the accompanying description. The method, generally depicted at 200, includes operating the cooler by enabling fluid to be cooled to pass through the heat exchange conduit, while monitoring cooler differential pressure data (step 203) and/or cooler temperature data (step 204). The data are compared with benchmark data or analysed with respect to time, to verify (step 206) whether the cooler apparatus is performing to expectations or requirements. Results of the verification may be used to automatically control or intervene (step 209) in the cooler operation (for example by adjusting flow parameters, implementing complementary flow assurance techniques, and/or halting flow temporarily). Alternatively, or in addition, the method may optionally include the steps of displaying design parameter information to an operator of the system (step 207) and/or receiving user input to control the cooler operation (step 208).

Although not depicted in FIG. 7 or 11, the cooler apparatus 118 may also be provided with a cleaning system, which functions to remove deposits of precipitated solids from the inner walls of the conduit system. Such a system is shown schematically in FIGS. 12A and 12B, which respectively are top cross sectional and side views of a cleaning apparatus for use in a system in accordance with an embodiment of the invention. The cleaning system 220 comprises one or more modules 9 movable in the direction of the arrow 223 to translate along the exterior of the heat exchange conduit 222 and heat the conduit by induction heating. Heating of the conduit causes melting the contact surface between the conduit surface and solid deposit layer, and flaking of the solid wax deposits 234 on the inner walls of the conduits as particles 230 into the bulk flow of the fluid. The cleaning system optionally includes means for cleaning the exterior of the conduits (e.g. removal of fouling) as the conduits are passed. An example of a suitable cleaning system is described in the applicant's patent publication number WO2015/062878.

The cleaning system may be operated in dependence on a predetermined cleaning regime, which has regular translations of the machine along the flow conduits of the cooler assembly, and which may be determined by calculation and/or empirical data. Alternatively or in addition, data collected from temperature and/or pressure sensors may be used to initiate or adjust a cleaning programme, in dependence on verification and monitored performance. Operation of the cleaning system may form a part of the process control step referred to in relation to FIG. 11.

Figure 12A:
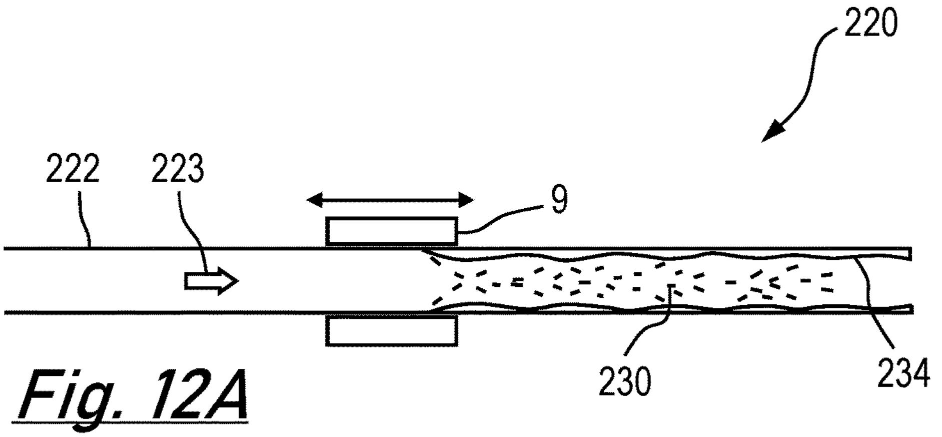
FIGS. 12A and 12B are respectively top cross sectional and side views of a cleaning apparatus for use in a system in accordance with an embodiment of the invention.
Figure 12B:
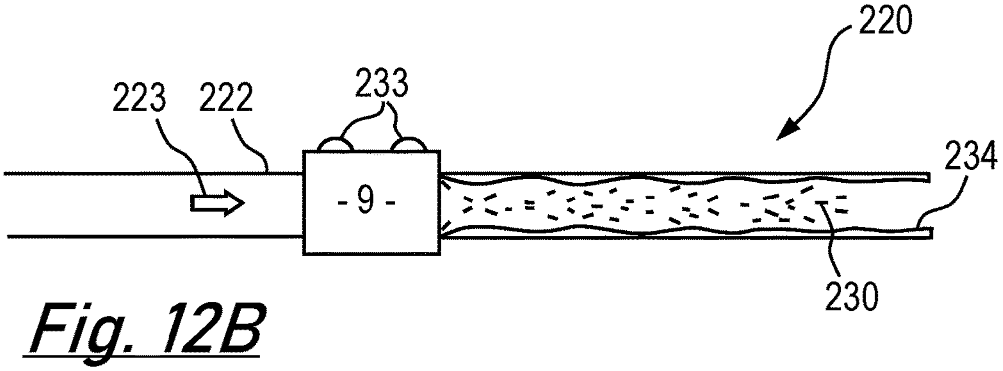
Figure 13:
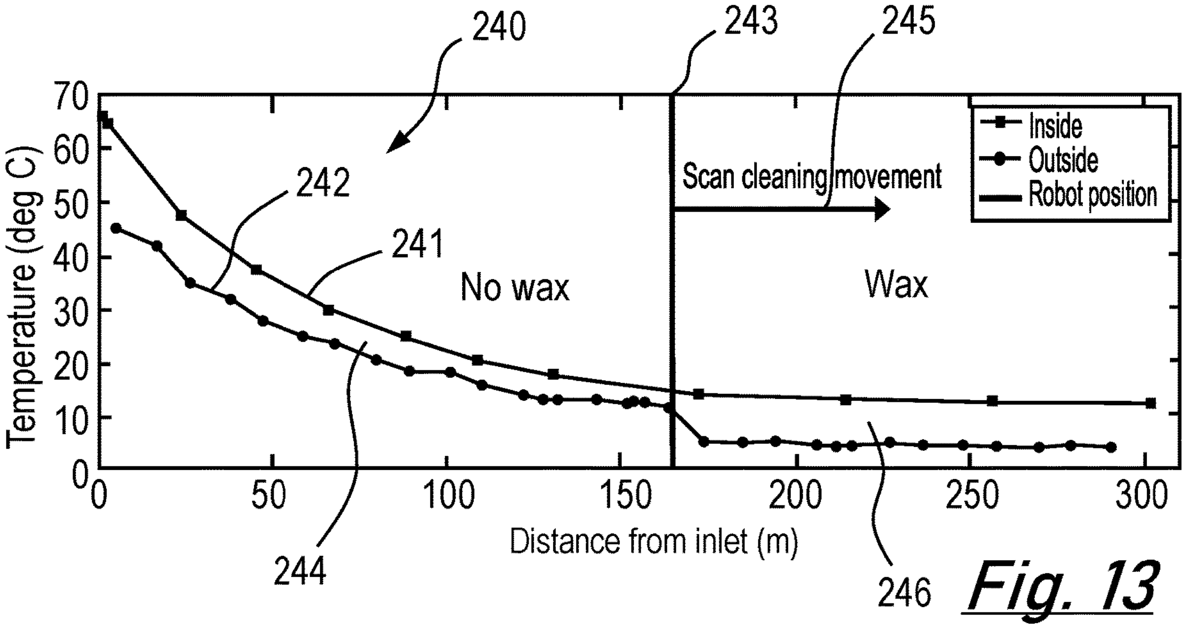
FIG. 13 is a graphical representation of a temperature of a fluid flowing in the system of FIGS. 8, 12A and 12B against distance along a cooler conduit, useful for understanding a method according to an embodiment of the invention.

FIG. 13 is derived from experimental testing of a fluid flowing in the system of FIGS. 12A and 12B, and is a graphical representation 240 of a temperature of a wax-containing fluid flowing against distance along a cooler conduit. The line 241 is a benchmark temperature profile, in this case obtained by measuring external temperature at intervals along the conduit, at a time it is known to be clean and free from deposits. Line 242 is a plot of measured external temperature after a period of operation. Line 243 is the position of a scanning cleaning element, for example of the type described in WO2015/062878, with the direction of movement represented by arrow 245. The plot to the left of line 243 has recently been cleaned, and shows a close concordance between the benchmark temperature data and the measured external temperature data. The plotted data to the right of the line 243 has not yet been cleaned, and indicates external temperature values lower than those expected of a clean conduit, indicative of thermally insulating deposited solids on the inside of the flowline wall. This information may be used to initiate a cleaning operation by scanning of the conduit with the cleaning vehicle. The cleaning process removes the solid wax layer from the conduit, and therefore removes the thermal insulation, which effectively brings the two lines 241 and 242 closer together.

Verification of the cleaning method can be performed by, for example, comparing the averaged difference in external temperature and the benchmark temperature before cleaning with the averaged difference after cleaning. The data show that the difference in temperature is reduced significantly by the cleaning process, verifying its effectiveness.

FIGS. 14A to 14D are derived from experimental testing of a wax-containing fluid flowing in the system of FIGS. 8, 12A and 12B. They are graphical representations of a temperature of the fluid against distance along the cooler conduit, taken at different times during cooler operation with a cyclical cleaning regime.

Figure 14A:
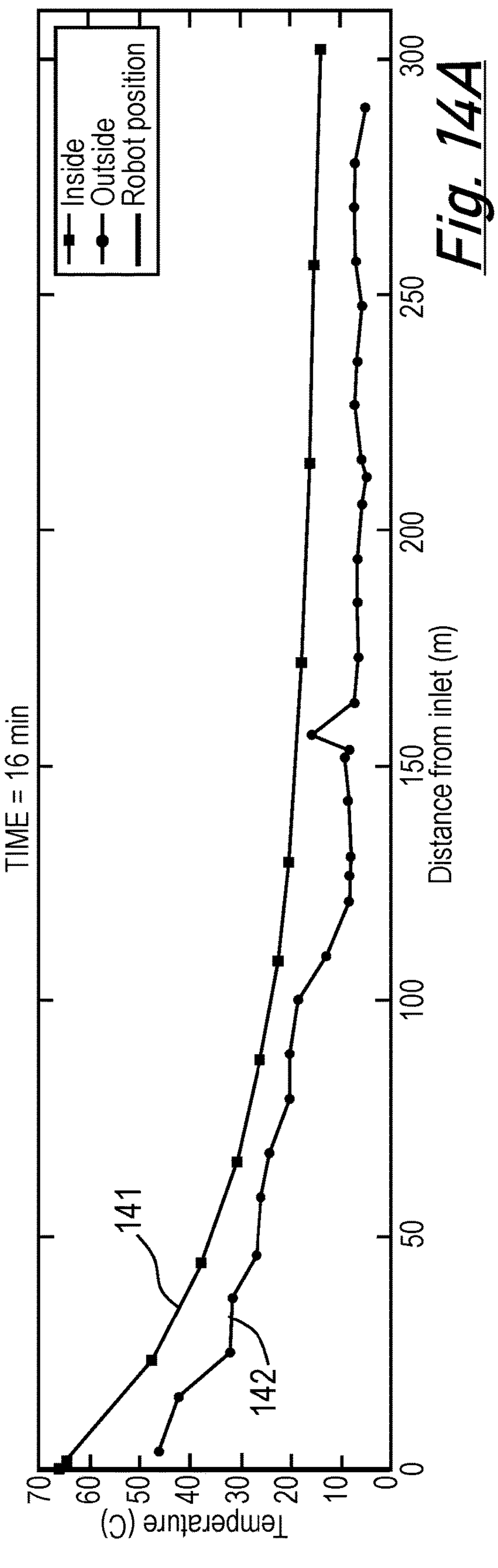
FIGS. 14A to 14D are graphical representations of a temperature of a fluid flowing in the system of FIGS. 8, 12A and 12B against distance along a cooler conduit, useful for understanding a method according to an embodiment of the invention.
Figure 14B:
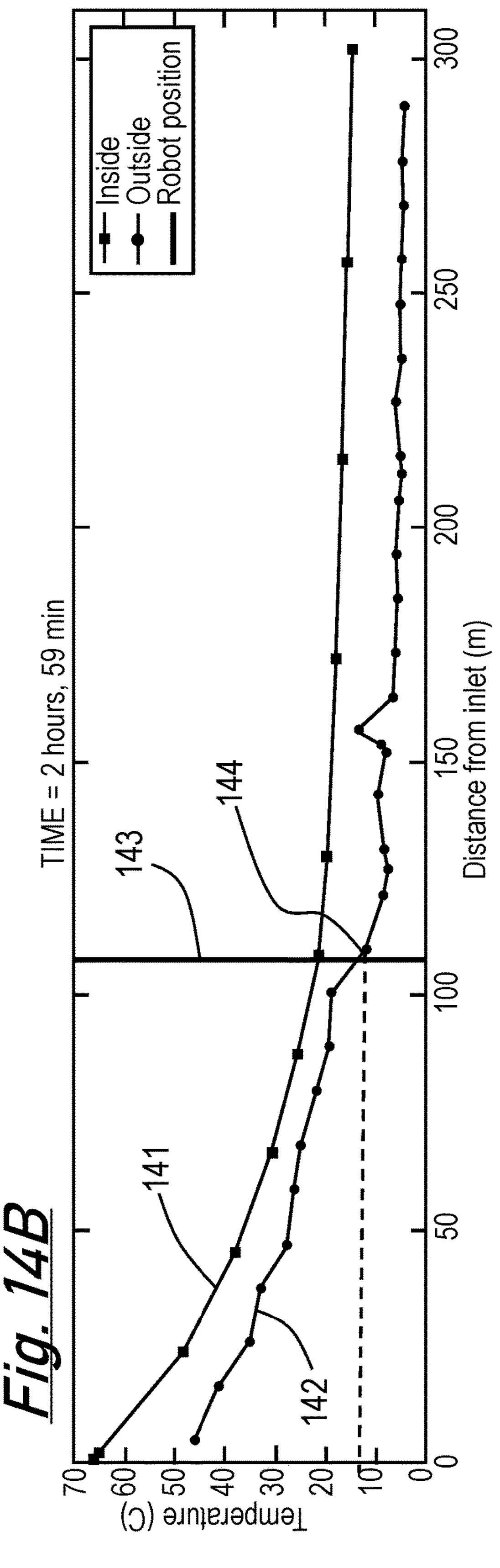

FIG. 14A shows the temperature profile at a first time (16 minutes), with a plot of internal temperature 141 and external temperature 142. FIG. 14B is the temperature profile at a second, later time (2 hours 59 minutes) during translation of the inductive heating cleaning system along the conduit, represented by line 143. As the cleaning robot 143 passes along the first approximately 100 m of the cooler conduit, there is a small effect on the plotted external temperature values if compared before (FIG. 14A) and after (FIG. 14B) the cleaning robot has passed, corresponding to the removal of the slight wax deposits formed due to the relatively cold pipe walls.

Figure 14C:
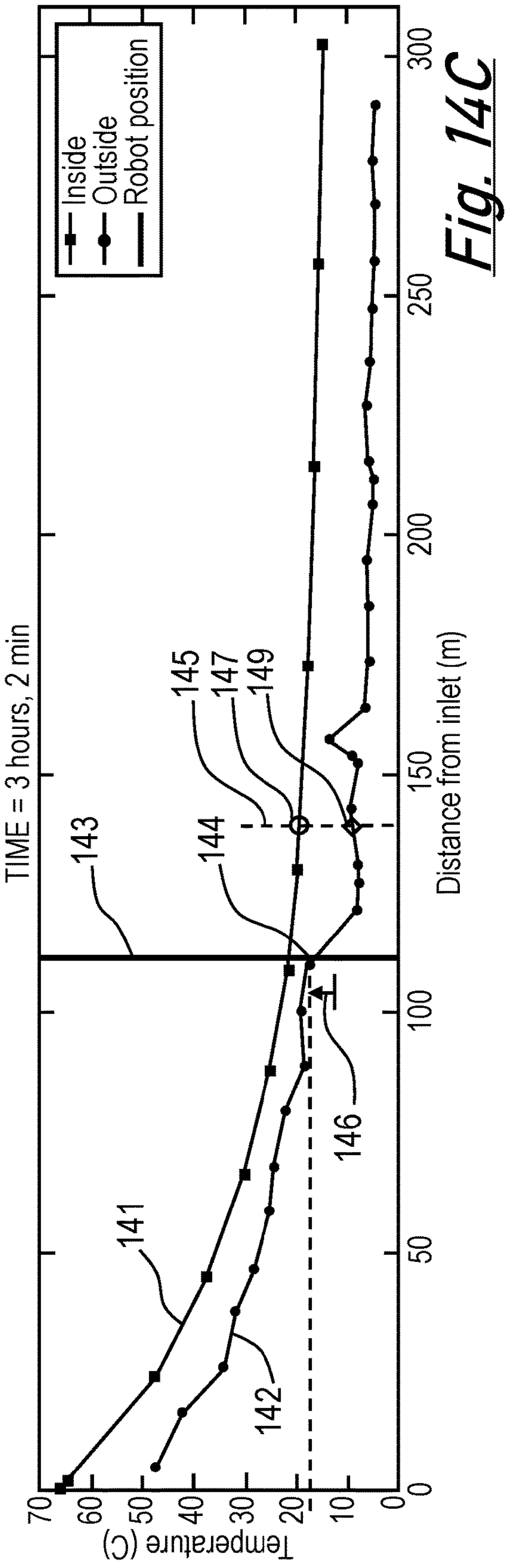

FIG. 14B shows the temperature profile at a time with cleaning robot located immediately before the datapoint 144, and FIG. 14C shows the temperature profile at a third time (3 hours 2 minutes), immediately after the cleaning robot 143 has passed the datapoint 144. The data show that as the cleaning robot passes the sensor at 144, the temperature increases from approximately 12 degrees C. (FIG. 14B) to approximately 18 degrees C. This temperature change is due to an increase in thermal flux from the cooled fluid to the exterior of the conduit, indicates that the cleaning system has had an effect on the thermal properties of the cooler system, i.e. that insulating wax deposits have been removed from the conduit wall at the location 144. The data enable the wax appearance temperature (WAT) to be determined; the data show that wax precipitation starts at about 30 degrees C., with the most significant precipitation occurring at around 20 degrees C. (see data point 144 on FIGS. 14B and 14C).

Figure 14D:
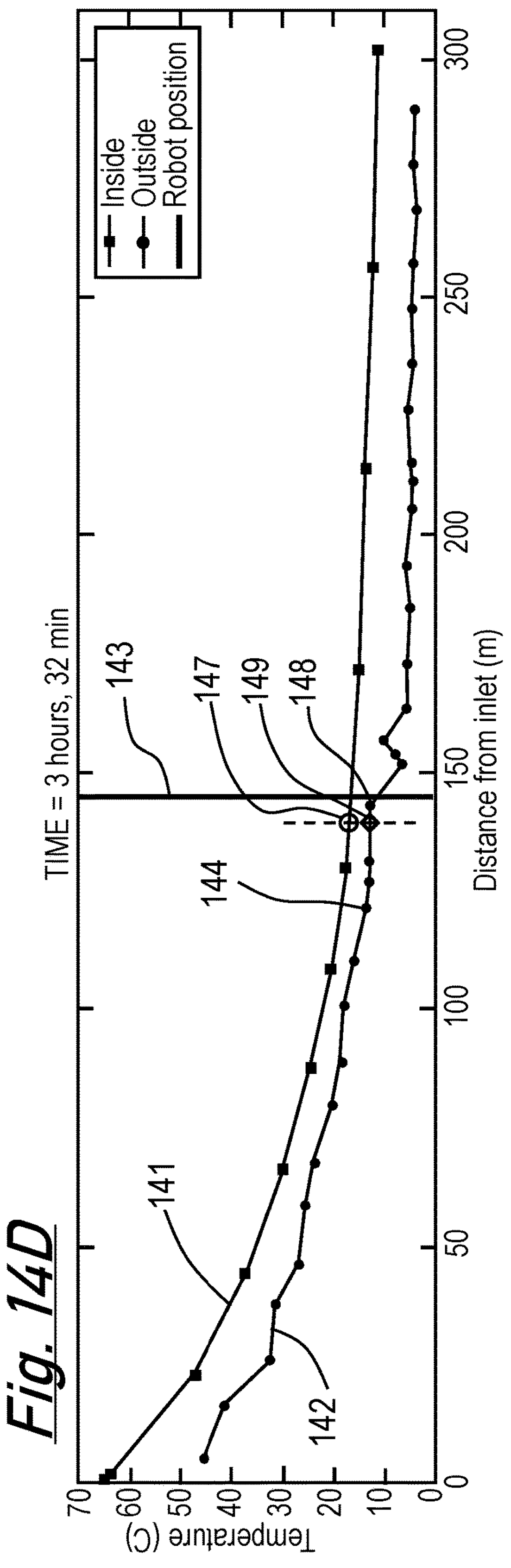

FIG. 14D shows the temperature profile at a fourth time (3 hours 22 minutes), and illustrates the effect of the cleaning robot on the external temperature, as wax deposits are cleaned from the conduit between the datapoints 144 and 148.

The data also show that cleaning can be effective throughout the cooler for a typical target temperature. Line 145 on FIGS. 14C and 14D corresponds to a distance along the cooler of approximately 140 m and an internal temperature at 147 of around 18 degrees C., which may be a reasonable target temperature for the outlet of a cooler apparatus (for example in an equipment inlet cooler application). The data show a change to the external temperature at the same point along the cooler, illustrated by the change in point 149 on line 145 between FIG. 14C and FIG. 14D), after the passage of the cleaning robot. This demonstrates that the cleaning is effective throughout the length of the cooler for the given target temperature.

Figure 15A:
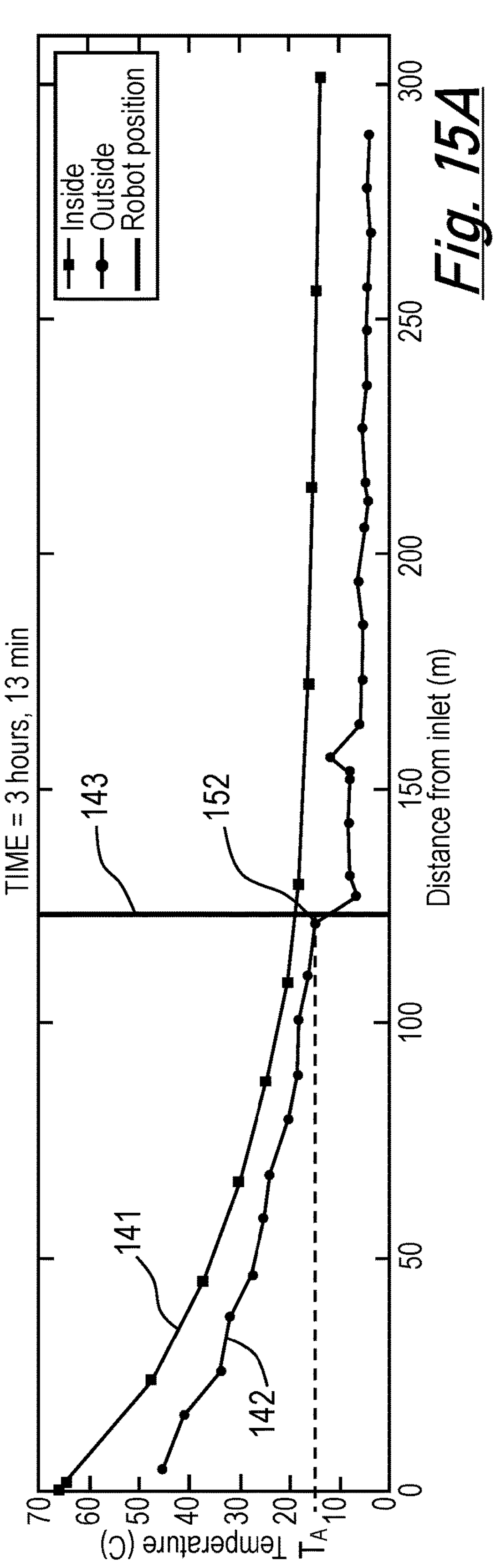
FIGS. 15A and 15B are graphical representations of a temperature of a fluid flowing in the system of FIGS. 8, 12A and 12B against distance along a cooler conduit, useful for understanding an alternative method according to an embodiment of the invention.
Figure 15B:
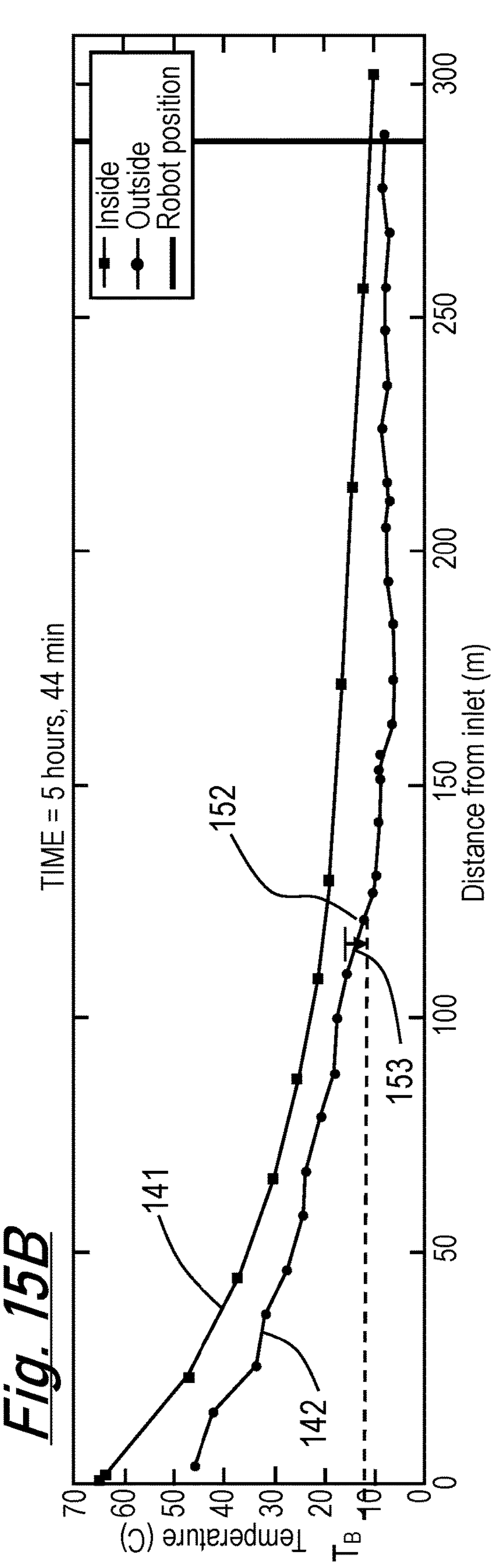

FIGS. 14A to 14D illustrate how temperature data can be used to derive a WAT and HET in a cooler system, but the system can also be used to derive solid deposition rates. FIGS. 15A and 15B are derived from experimental testing of a wax-containing fluid flowing in the system of FIGS. 8, 12A and 12B. The are graphical representations of a temperature of the flowing fluid against distance along a cooler conduit, taken at different times during cooler operation with a cyclical cleaning regime.

FIG. 15A shows the temperature profile at a first time (3 hours 13 minutes), with a plot of internal temperature 141 and external temperature 142. FIG. 15B is the temperature profile at a second, later time (5 hours 44 minutes) during translation of the inductive heating cleaning system along the conduit, represented by line 143. In the elapsed time, the external temperature at a selected data point 152 has decreased from a first value $T_A$ to a second value $T_B$. At the later time of FIG. 15B, deposits have been allowed to build up on the interior of the conduit. With knowledge of the thermal properties of a deposited wax layer (taken from calculation and/or measurement), the thickness of the wax layer at the later time (FIG. 15B) can be determined from the temperature difference 153, and the rate of deposition at the location of sensor 153 can be calculated.

Although the results shown in FIGS. 10B, 13, 14A to D, 15A and 15B are derived from experimental tests with hydrocarbon fluids containing wax only, similar results were obtained from experimental testing using hydrocarbon fluids containing hydrates and wax, as the deposition mechanisms and thermodynamic effects are similar.

The invention provides a method of cooling a flowing fluid in a hydrocarbon flow system using a heat exchange cooler apparatus having at least one cooler conduit; and a sensor system. The method comprises flowing the fluid through the cooler conduit from a cooler inlet to a cooler outlet to cool the fluid and operating a cleaning system to deliver energy (e.g. heat) to the cooler conduit to cause solid materials deposited on the interior of the cooler to be released into the flowing fluid. A cooler sensor data set obtained from the sensor system is compared with a reference data set to verify the performance of the cleaning system.

The coolers of the foregoing embodiments are shown as comprising a single heat exchange conduit between an inlet and an outlet, but it will be appreciated that other cooler configurations are within the scope of the invention, including but not limited to manifold coolers, spool coolers, shell-and-tube coolers, active and passive coolers, plate-coolers, and closed and open systems. In particular, a cooler apparatus of an embodiment of the invention comprises multiple heat exchange conduits arranged in parallel, each of similar form and function. Production fluid is then caused to flow through multiple heat exchange conduits in parallel, which increases the cooling capacity of the apparatus when required for the production fluid flow conditions. Flow into the multiple heat exchange conduits may be controlled by the provision of a manifold system with flow control valves, or by splitting the flow from a single inlet conduit. Such arrangements of parallel cooler conduits allow higher flow rates to be accommodated (for example during the early lifetime of a well), retaining throughput, while still using conduit diameters that create the desired turbulence in the fluid flowing through the cooler for effective operation. During a later time, if the flow rate of production fluid reduces, one or more of the cooler conduits can be taken offline. The reduction in flow area through the cooler system enables turbulence to be maintained at the lower production flow rate. Such parallel conduit systems could be configured as manifold flow coolers, spool coolers, helix coolers, shell and tube coolers, and/or box coolers. In each case, each parallel cooler conduit would have a respective return line and secondary inlet system for seeding.

In a variation to the described embodiments, as an alternative or in addition to the use of temperature measurements and monitoring temperature changes over time at particular sensor locations, the cooler apparatus may comprise a plurality of pressure sensors along the length of the cooler apparatus, which may be used to detect and monitor local changes in pressure drop. Local changes in pressure drop enable determination of the locations of solid deposition, and enable WAT and/or HET to be derived from the measured data. Similarly, rates of deposition can be determined by analysing changes in pressure drop with respect to time.

In a particular embodiment of the invention the cooler system comprises a return line used for example to boost production and/or to feed seed particles. The return line in such an embodiment is fluidly connected between a return location, located at a point downstream of the main cooler inlet and a secondary inlet point that is upstream of the return location. The return line may have a pump means and a flow control means, to enable a selected portion of the flow from the cooler system to be recycled and fed into the flow system upstream of the return location. In this way, the colder recycled fluid will act as a cooling agent for the warmer fluid in the feed flowline entering the heat exchange conduits of the cooler system. A beneficial effect of feeding a fraction of the cooled fluids into the warm well stream in the feed flowline before it enters the cooling conduits is that comparably dry hydrate seed particles and wax particles are introduced into the flow. These particles are in effect catalytic seed particles that form kernels for the further particle growth in the fluid. The particles are suspended in the liquid phase as the well stream enters the cooling section, yielding less deposit in the cooling flowline. The return line may be provided with a system for cleaning or otherwise mitigating against build-up of deposits on the conduit, for example an internal pig, heat tracing elements, or a hot oil flushing system in accordance with prior art (see for example as disclosed in WO 2012/093079).

Variations to the described embodiments may include equipment for collecting and/or removing solids from flowing fluid in the system. Examples of possible equipment include solid-liquid separators such as cyclone units, configured to remove solids from the bulk flow of hydrocarbons. The solid removal equipment may include multiple units or stages in parallel or in series, and may operate continuously or semi-continuously. The equipment may be located at strategically selected parts of the flow system, for example upstream of equipment sensitive to solids in the flow such as compressors.

Various modifications to the above-described embodiments may be made within the scope of the invention, and the invention extends to combinations of features other than those expressly claimed herein.

The invention claimed is:

1. A method of cooling a flowing fluid in a hydrocarbon flow system using a heat exchange cooler apparatus, wherein the heat exchange cooler apparatus comprises:

at least one cooler conduit; and a sensor system;

the method comprising:

flowing the fluid through the cooler conduit from a cooler inlet to a cooler outlet to cool the fluid;

operating a cleaning system, the cleaning system delivering energy to the cooler conduit to cause solid materials deposited on the interior of the cooler conduit to be released into the flowing fluid;

receiving a cooler sensor data set obtained from the sensor system; and comparing the cooler sensor data set with a reference data set to verify the performance of the cleaning system.

2. The method according to claim 1, wherein the sensor system comprises at least one temperature sensor, and the reference data set comprises reference temperature data.

3. The method according to claim 1, wherein the sensor system comprises both temperature sensors and pressure sensors, and the reference data set comprises reference temperature data and reference pressure data.

4. The method according to claim 1, wherein the reference data set corresponds to a clean state of the cooler conduit.

5. The method according to claim 1, wherein reference data set comprises a plurality of data points corresponding to a plurality of positions separated along the length of the cooler conduit.

6. The method according to claim 1, wherein the sensor system comprises one or more temperature sensors external to the cooler conduit.

7. The method according to claim 1, comprising operating the cleaning system cyclically during the cooling of the flowing fluid.

8. The method according to claim 1, wherein operating the cleaning system comprises delivering energy to the cooler conduit to cause solid materials deposited on the interior of the cooler to be released into the flowing fluid as particles.

9. The method according to claim 1, wherein verifying the performance of the cleaning system comprises identifying the presence or absence of a condition indicative of a build-up and/or removal of deposits on surfaces of the cooler conduit.

10. The method according to claim 1, comprising adjusting an operating parameter of the cleaning system in response to the comparison of the cooler sensor data set with the reference data set.

11. The method according to claim 10, wherein the operating parameter is selected from the group comprising: frequency of cleaning cycle; intensity of cleaning operation;

duration of cleaning operation; location of cleaning operation; physical extent of cleaning operation; type of cleaning operation.

12. The method according to claim 1, comprising comparing the cooler data set with a reference data set to determine one or more characteristics relating to the precipitation of solids in the cooler.

13. The method according to claim 12, wherein the sensor system comprises a plurality of temperature sensors separated along the length of the cooler conduit; and wherein the method comprises:

receiving a cooler temperature data set obtained from the plurality of temperature sensors; and comparing the cooler temperature data set with a reference temperature data set to determine one or more characteristics relating to the precipitation of solids in the cooler.

14. The method according to claim 12, wherein the determined one or more characteristics are selected from the group comprising: the presence or absence of precipitation; an onset temperature for precipitation of a solid; Wax Appearance Temperature (WAT); Hydrate Equilibrium Temperature (HET); rate of deposition of a solid.

15. A cooler system for a hydrocarbon flow system, the cooler system comprising:

a heat exchange cooler apparatus comprising at least one cooler conduit and a sensor system;

a cleaning system operable to delivering energy to the cooler conduit to cause solid materials deposited on the interior of the cooler conduit to be released into the flowing fluid; and a processing module;

wherein the processing module is configured to receive a cooler sensor data set obtained from the sensor system and compare the cooler sensor data set with a reference data set to verify the performance of the cleaning system.

16. The cooler system according to claim 15, wherein the sensor system comprises at least one temperature sensor.

17. The cooler system according to claim 16, wherein the sensor system comprises one or more temperature sensors distributed along the length of the cooler conduit.

18. The cooler system according to claim 15, wherein the sensor system comprises at least one pressure sensor.

19. The cooler system according to claim 15, wherein the sensor system comprises at least two pressure sensors separated along the length of the cooler conduit, configured for measuring a pressure differential along at least a part of the cooler conduit.

20. The cooler system according to claim 15, wherein the cleaning system is configured to heat the cooler conduit.

21. A method of cleaning a cooler conduit of a heat exchange cooler in a hydrocarbon flow system, the method comprising:

operating a cleaning system to deliver energy to the cooler conduit and cause solid materials deposited on the interior of the cooler conduit to be released into the flowing fluid;

receiving a cooler sensor data set obtained from a sensor system of the cooler; and comparing the cooler sensor data set with a reference data set to verify the performance of the cleaning system.

22. The method according to claim 21, comprising adjusting an operating parameter of the cleaning system in response to the comparison of the cooler sensor data set with the reference data set.

23. The method according to claim 22, wherein the operating parameter is selected from the group comprising: frequency of cleaning cycle; intensity of cleaning operation; duration of cleaning operation; location of cleaning operation; physical extent of cleaning operation; type of cleaning operation.

* * * * *